(12) United States Patent  (10) Patent No.: US 7,324,118 B2
Fujioka et al.  (45) Date of Patent: Jan. 29, 2008

(54) SUPER IMPOSED IMAGE DISPLAY COLOR SELECTION SYSTEM AND METHOD

(75) Inventors: Susumu Fujioka, Zama (JP); Kunikazu Tsuda, Sagamihara (JP); Kohji Hikawa, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 333 days.

(21) Appl. No.: 11/079,680

(22) Filed: Mar. 14, 2005

(65) Prior Publication Data

US 2005/0156943 A1 Jul. 21, 2005

Related U.S. Application Data

(63) Continuation of application No. 09/944,444, filed on Aug. 31, 2001, now Pat. No. 7,071,950.

(51) Int. Cl.
*G06K 1/00* (2006.01)
*G09G 5/02* (2006.01)
*G09G 5/00* (2006.01)
*H04N 1/60* (2006.01)
*G06F 3/33* (2006.01)
*G09G 5/06* (2006.01)
*H04N 1/52* (2006.01)

(52) U.S. Cl. ............... 345/589; 345/591; 345/593; 345/597; 345/606; 348/498; 348/557; 348/649; 348/687; 358/516; 358/520; 358/525; 358/518; 382/162; 382/167

(58) Field of Classification Search ........ 345/597–604, 345/589–593, 619, 690, 694, 629–630, 643; 382/162–167; 358/516–520, 525; 348/496, 348/498, 557, 582–587, 598–599, 649, 687, 348/702–703
See application file for complete search history.

(56) References Cited

U.S. PATENT DOCUMENTS 5,032,483 A * 7/1991 Ichimura et al. ......... 430/108.3

(Continued)

FOREIGN PATENT DOCUMENTS

JP  04-010994 B2  1/1992

(Continued)

OTHER PUBLICATIONS

Japan Office Action for JP Patent Application No. 2000-265029 dated Aug. 22, 2006 with English translation and cited references with English abstracts.

*Primary Examiner*—Wesner Sajous
(74) *Attorney, Agent, or Firm*—Knoble Yoshida & Dunleavy, LLC.

(57) ABSTRACT

An optimal pen color is automatically selected for a given background color based upon a predetermined relative distance in the Munsell color-order system. The predetermined distance is defined in terms of saturation, hue and or lightness. In general, sufficient visual distinction is observed when the color representations of the pen and the background are separated by the predetermined relative distance in the Munsell color-order system.

54 Claims, 14 Drawing Sheets

U.S. PATENT DOCUMENTS

| | | | |
|---|---|---|---|
| 5,416,848 A * | 5/1995 | Young | 382/191 |
| H1506 H * | 12/1995 | Beretta | 345/591 |
| 5,664,072 A * | 9/1997 | Ueda et al. | 358/1.9 |
| 6,081,253 A * | 6/2000 | Luke et al. | 345/604 |
| 6,306,409 B1 * | 10/2001 | Ogawa et al. | 424/401 |
| 6,491,750 B1 * | 12/2002 | Pace et al. | 106/456 |
| 6,563,510 B1 * | 5/2003 | Rice et al. | 345/593 |
| 6,632,093 B1 * | 10/2003 | Rice et al. | 434/98 |
| 7,071,950 B2 * | 7/2006 | Fujioka et al. | 345/589 |
| 2005/0146531 A1 * | 7/2005 | Rice et al. | 345/593 |

FOREIGN PATENT DOCUMENTS

| | | |
|---|---|---|
| JP | 06-110424 A | 4/1994 |
| JP | 06-274639 A | 9/1994 |
| JP | 09-062238 A | 3/1997 |
| JP | 09-114591 | 5/1997 |
| JP | 09-172555 A | 6/1997 |
| JP | 09-198491 B2 | 7/1997 |
| JP | 09-311926 A | 12/1997 |
| JP | 11-282941 | 10/1999 |
| JP | 11-327789 | 11/1999 |
| JP | 03-239290 A | 10/2001 |

* cited by examiner

SUPER IMPOSED IMAGE DISPLAY COLOR SELECTION SYSTEM AND METHOD

This is a continuation of prior application Ser. No. 09/944,444 filed on Aug. 31, 2001 now U.S. Pat No. 7,071,950 under 35 C.F.R 1.53(b).

FIELD OF THE INVENTION

The current invention is generally related to color display devices and methods, and more particularly related to selecting a color to display image such as characters and diagrams over existing color image in display devices such as personal computers and personal digital assistants.

BACKGROUND OF THE INVENTION

In order to improve operability, computer graphics utilizes separate colors for entries and background in an input screen as disclosed in Japanese Patent Publication Hei 7-325666. Instead of using a mouse or a keyboard, an input pen or stylus is used to input information, and the input pen is also used with a computer in video conferencing. For example, a liquid crystal display device as disclosed in Japanese Patent Publication Hei 9-114591 recognizes coordinates of an input pen position when the input pen is placed on the liquid crystal display unit. Based upon these coordinates, as the input pen moves on the liquid crystal display unit, a trace is displayed in a predetermined color. In the above display unit, the traces or lines are displayed over existing images by superimposing the lines. By using a large color display screen, the above display is highly useful for conferences, presentations or education.

In the above described input pen system, the color of an input pen is predetermined prior to use. In certain instances, the selected pen color may be identical to or substantially similar to a background color of the display image. As a result of the above undesirable input color selection, the line traces of the input pen may not be easily discernible. In particular, when a large display unit is used for a presentation to a group of people and input pen traces are not easily identifiable from the existing image or background color, the display presentation system has a serious flaw. In other words, the need for specifying an input color substantially reduces the operability and convenience.

For presentations using a large color display unit, when a group of people recognizes superimposed line traces in images, it is highly desirable for the line traces and other graphics to be easily recognized. Even when a small screen device or an individual document generating device such as a PC is used to prepare the presentation material, the lines and images are easily discernible. However, the same data may not be easily discernible on a large screen without a sufficient amount of projection light. In these document generation devices such as PC's, a user specifies the color of lines and characters to indicate emphasis, and an appropriate color with respect to the background color is not automatically selected.

In a different application of the line trace, a karaoke machine generally indicates words in a predetermined color that is easy to read against the background. However, the color of words may sometimes becomes substantially similar to that of the still or animated background, and it becomes difficult to read the words.

In general, a complementary color is used to distinguish a display color or a pen color from a background color. The complementary color is a color that generates gray when it is mixed with the background color. However, a simple complementary color is not necessarily the most readily visible to all people. In fact, a certain color combination is not always pleasing to many, and may be unsuitable in some business situations. For example, the background color and the pen color are respectively green and pink for the complementary color combination. The color pink may not be appropriate in conservation presentation material.

The above described problems demand a method and a device for automatically selecting a desirable input pen color with respect to a background color to maximize the visibility of input images.

SUMMARY OF THE INVENTION

In order to solve the above and other problems, according to a first aspect of the current invention, a method of selecting an optimal color with respect to a background color using Munsell color-order system, the Munsell color-order system being represented in a three dimensional space around an achromatic axis in a vertical direction, the vertical direction representing a predetermined lightness range of lightness levels, a horizontal direction representing a predetermined saturation range of saturation levels, a circumference around the achromatic axis representing a predetermined hue range of hue levels, including: selecting a first point in the Munsell color-order system as a first color; and selecting a second point in the Munsell color-order system as a second color at a predetermined relative distance from the first point, a first distance and a second distance being defined from the achromatic axis respectively to the first point and the second point, a ratio of the first distance over the second distance being equal to or more than four, wherein the second color is distinctive in combination with the first color for desired human perception.

According to a second aspect of the current invention, a method of selecting an optimal color with respect to a background color using the Munsell color-order system, the Munsell color-order system being represented in a three dimensional space around an achromatic axis in a vertical direction, the vertical direction representing a predetermined lightness ranges of lightness levels, a horizontal direction representing a predetermined saturation range of saturation levels, a circumference around the achromatic axis representing a predetermined hue range of hue levels, including: selecting a first point in the Munsell color-order system as a first color; and selecting a second point in the Munsell color-order system as a second color at a predetermined relative distance from the first point, a first distance and a second distance being defined from the achromatic axis respectively to the first point and the second point, a ratio of the first distance over the second distance being equal to or less than one-fourth, wherein the second color is distinctive in combination with the first color for desired human perception.

According to a third aspect of the current invention, a memory medium storing a computer executable program for selecting an optimal color with respect to a background color using the Munsell color-order system, the Munsell color-order system being represented in a three dimensional space around an achromatic axis in a vertical direction, the vertical direction representing a predetermined lightness range of lightness levels, a horizontal direction representing a predetermined saturation range of saturation levels, a circumference around the achromatic axis representing a predetermined hue range of hue levels, the computer executable performing the tasks including: selecting a first point in the Munsell color-order system as a first color; and selecting a second point in the Munsell color-order system as a second color at a predetermined relative distance from the first point, a first distance and a second distance being defined from the achromatic axis respectively to the first point and the second point, a ratio of the first distance over the second distance being equal to or more than four, wherein the second color is distinctive in combination with the first color for desired human perception.

According to a fourth aspect of the current invention, a memory medium storing a computer executable program for selecting an optimal color with respect to a background color using the Munsell color-order system, the Munsell color-order system being represented in a three dimensional space around an achromatic axis in a vertical direction, the vertical direction representing a predetermined lightness range of lightness levels, a horizontal direction representing a predetermined saturation range of saturation levels, a circumference around the achromatic axis representing a predetermined hue range of hue levels, including: selecting a first point in the Munsell color-order system as a first color; and selecting a second point in the Munsell color-order system as a second color at a predetermined relative distance from the first point, a first distance and a second distance being defined from the achromatic axis respectively to the first point and the second point, a ratio of the first distance over the second distance being equal to or less than one-fourth, wherein the second color is distinctive in combination with the first color for desired human perception.

According to a fifth aspect of the current invention, a system for selecting an optimal color with respect to a background color using the Munsell color-order system, including: a memory storage unit for storing data for representing the Munsell color-order system, the Munsell color-order system being represented in a three dimensional space around an achromatic axis in a vertical direction, the vertical direction representing a predetermined lightness range of lightness levels, a horizontal direction representing a predetermined saturation range of saturation levels, a circumference around the achromatic axis representing a predetermined hue range of hue levels; a processing unit connected to the memory storage unit for selecting a first point in the Munsell color-order system as a first color, the processing unit selecting a second point in the Munsell color-order system as a second color at a predetermined relative distance from the first point, a first distance and a second distance being defined from the achromatic axis respectively to the first point and the second point, a ratio of the first distance over the second distance being equal to or more than four, wherein the second color is distinctive in combination with the first color for desired human perception.

According to a sixth aspect of the current invention, a system for selecting an optimal color with respect to a background color using the Munsell color-order system, including: a memory storage unit for storing data for representing the Munsell color-order system, the Munsell color-order system being represented in a three dimensional space around an achromatic axis in a vertical direction, the vertical direction representing a predetermined lightness range of lightness levels, a horizontal direction representing a predetermined saturation range of saturation levels, a circumference around the achromatic axis representing a predetermined hue range of hue levels; a processing unit connected to the memory storage unit for selecting a first point in the Munsell color-order system as a first color, the processing unit selecting a second point in the Munsell color-order system as a second color at a predetermined relative distance from the first point, a first distance and a second distance being defined from the achromatic axis respectively to the first point and the second point, a ratio of the first distance over the second distance being equal to or less than one fourth, wherein the second color is distinctive in combination with the first color for desired human perception.

According to a seventh aspect of the current invention, a method of selecting an optimal color with respect to a background color using Munsell color-order system, the Munsell color-order system being represented in a three dimensional space around an achromatic axis in a vertical direction, the vertical direction representing a predetermined lightness range of lightness levels, a horizontal direction representing a predetermined saturation range of saturation levels, a circumference around the achromatic axis representing a predetermined hue range of hue levels, including: selecting a first point in the Munsell color-order system as a first color; selecting a second point in the Munsell color-order system as a second color at a predetermined relative distance from the first point, the first point and the second point forming a relative distance line, the second color being sufficiently distinctive in combination with the first color for desired human perception; and determining an optimal color range of colors from the second point in the Munsell color-order system, the second color being selected from the optimal color range, an inter-point distance being defined between the first point and the second point, the first point and the second point forming a perpendicularly intersecting line that intersects the achromatic axis and is perpendicular to the achromatic axis, wherein the first point is on the achromatic axis while the second point is off the achromatic axis, and wherein the inter-point distance is at least four.

According to an eighth aspect of the current invention, a method of selecting an optimal color with respect to a background color using Munsell color-order system, the Munsell color-order system being represented in a three dimensional space around an achromatic axis in a vertical direction, the vertical direction representing a predetermined lightness range of lightness levels, a horizontal direction representing a predetermined saturation range of saturation levels, a circumference around the achromatic axis representing a predetermined hue range of hue levels, including: selecting a first point in the Munsell color-order system as a first color; selecting a second point in the Munsell color-order system as a second color at a predetermined relative distance from the first point, the first point and the second point forming a relative distance line, the second color being sufficiently distinctive in combination with the first color for desired human perception; and determining an optimal color range of colors from the second point in the Munsell color-order system, the second color being selected from the optimal color range, wherein an inter-point distance is defined between the first point and the second point, the first point and the second point forming a parallel line that is parallel to the achromatic axis, the inter-point distance being at least four.

According to a ninth aspect of the current invention, a memory medium storing a computer executable program for selecting an optimal color with respect to a background color using Munsell color-order system, the Munsell color-order system being represented in a three dimensional space around an achromatic axis in a vertical direction, the vertical direction representing a predetermined lightness range of lightness levels, a horizontal direction representing a predetermined saturation range of saturation levels, a circumference around the achromatic axis representing a predetermined hue range of hue levels, the executable program, including: selecting a first point in the Munsell color-order system as a first color; selecting a second point in the Munsell color-order system as a second color at a predetermined relative distance from the first point, the first point and the second point forming a relative distance line, the second color being sufficiently distinctive in combination with the first color for desired human perception; and determining an optimal color range of colors from the second point in the Munsell color-order system, the second color being selected from the optimal color range, wherein an inter-point distance is defined between the first point and the second point, the first point and the second point forming a perpendicularly intersecting line that intersects the achromatic axis and is perpendicular to the achromatic axis, and wherein the first point is on the achromatic axis while the second point is off the achromatic axis, the inter-point distance being at least four.

According to a tenth aspect of the current invention, a memory medium storing a computer executable program for selecting an optimal color with respect to a background color using Munsell color-order system, the Munsell color-order system being represented in a three dimensional space around an achromatic axis in a vertical direction, the vertical direction representing a predetermined lightness range of lightness levels, a horizontal direction representing a predetermined saturation range of saturation levels, a circumference around the achromatic axis representing a predetermined hue range of hue levels, the executable program including: selecting a first point in the Munsell color-order system as a first color; selecting a second point in the Munsell color-order system as a second color at a predetermined relative distance from the first point, the first point and the second point forming a relative distance line, the second color being sufficiently distinctive in combination with the first color for desired human perception; and determining an optimal color range of colors from the second point in the Munsell color-order system, the second color being selected from the optimal color range, wherein an inter-point distance is defined between the first point and the second point, the first point and the second point forming a parallel line that is parallel to the achromatic axis, the inter-point distance being at least four.

According to a eleventh aspect of the current invention, a system for selecting an optimal color with respect to a background color using Munsell color-order system, including: a memory storage unit for storing data for representing the Munsell color-order system, the Munsell color-order system being represented in a three dimensional space around an achromatic axis in a vertical direction, the vertical direction representing a predetermined lightness range of lightness levels, a horizontal direction representing a predetermined saturation range of saturation levels, a circumference around the achromatic axis representing a predetermined hue range of hue levels; a processing unit connected to the memory storage unit for selecting a first point as a first color and a second point in the Munsell color-order system as a second color at a predetermined relative distance from the first point, the first point and the second point forming a relative distance line, the second color being sufficiently distinctive in combination with the first color for desired human perception, the processing unit also determining an optimal color range of colors from the second point in the Munsell color-order system, the second color being selected from the optimal color range; and a display unit connected to the processing unit for displaying the second color against the first color, wherein an inter-point distance is defined between the first point and the second point, the processing unit selecting the second point so that the first point and the second point forms perpendicularly intersecting line that intersects the achromatic axis and is perpendicular to the achromatic axis, wherein the first point is on the achromatic axis while the second point is off the achromatic axis, the processing unit selecting the second point so that the inter-point distance is at least four.

According to a twelfth aspect of the current invention, a system for selecting an optimal color with respect to a background color using Munsell color-order system, including: a memory storage unit for storing data for representing the Munsell color-order system, the Munsell color-order system being represented in a three dimensional space around an achromatic axis in a vertical direction, the vertical direction representing a predetermined lightness range of lightness levels, a horizontal direction representing a predetermined saturation range of saturation levels, a circumference around the achromatic axis representing a predetermined hue range of hue levels; a processing unit connected to the memory storage unit for selecting a first point as a first color and a second point in the Munsell color-order system as a second color at a predetermined relative distance from the first point, the first point and the second point forming a relative distance line, the second color being sufficiently distinctive in combination with the first color for desired human perception, the processing unit also determining an optimal color range of colors from the second point in the Munsell color-order system, the second color being selected from the optimal color range; and a display unit connected to the processing unit for displaying the second color against the first color, wherein an inter-point distance is defined between the first point and the second point, the processing unit selecting the second point so that the first point and the second point form a parallel line that is parallel to the achromatic axis and that the inter point distance is at least four.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1:
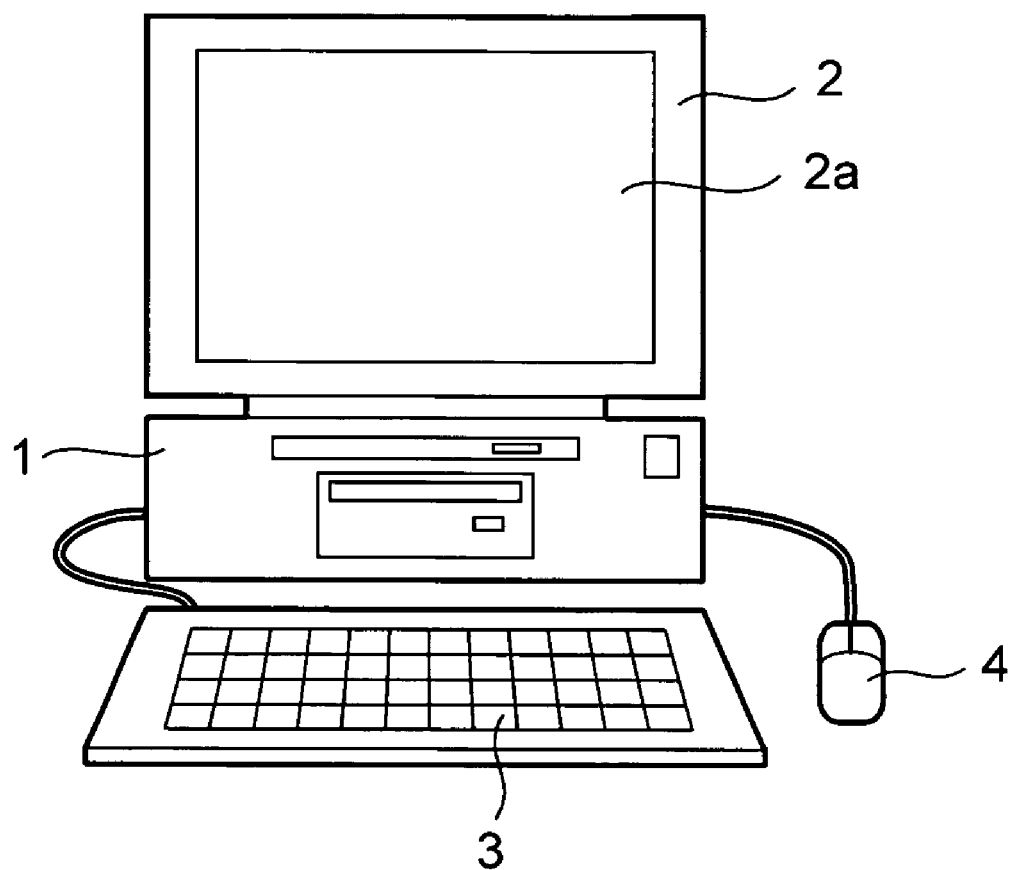
FIG. 1 is a diagram illustrating one preferred embodiment of the color selection display unit according to the current invention.

Referring now to the drawings, wherein like reference numerals designate corresponding structures throughout the views, and referring in particular to FIG. 1, one preferred embodiment of the color selection display unit according to the current invention is implemented on a personal computer (PC) for generating a document to be presented at a conference. The PC 1 is connected to a display monitor 2, a keyboard 3 and a mouse 4.

Figure 2:
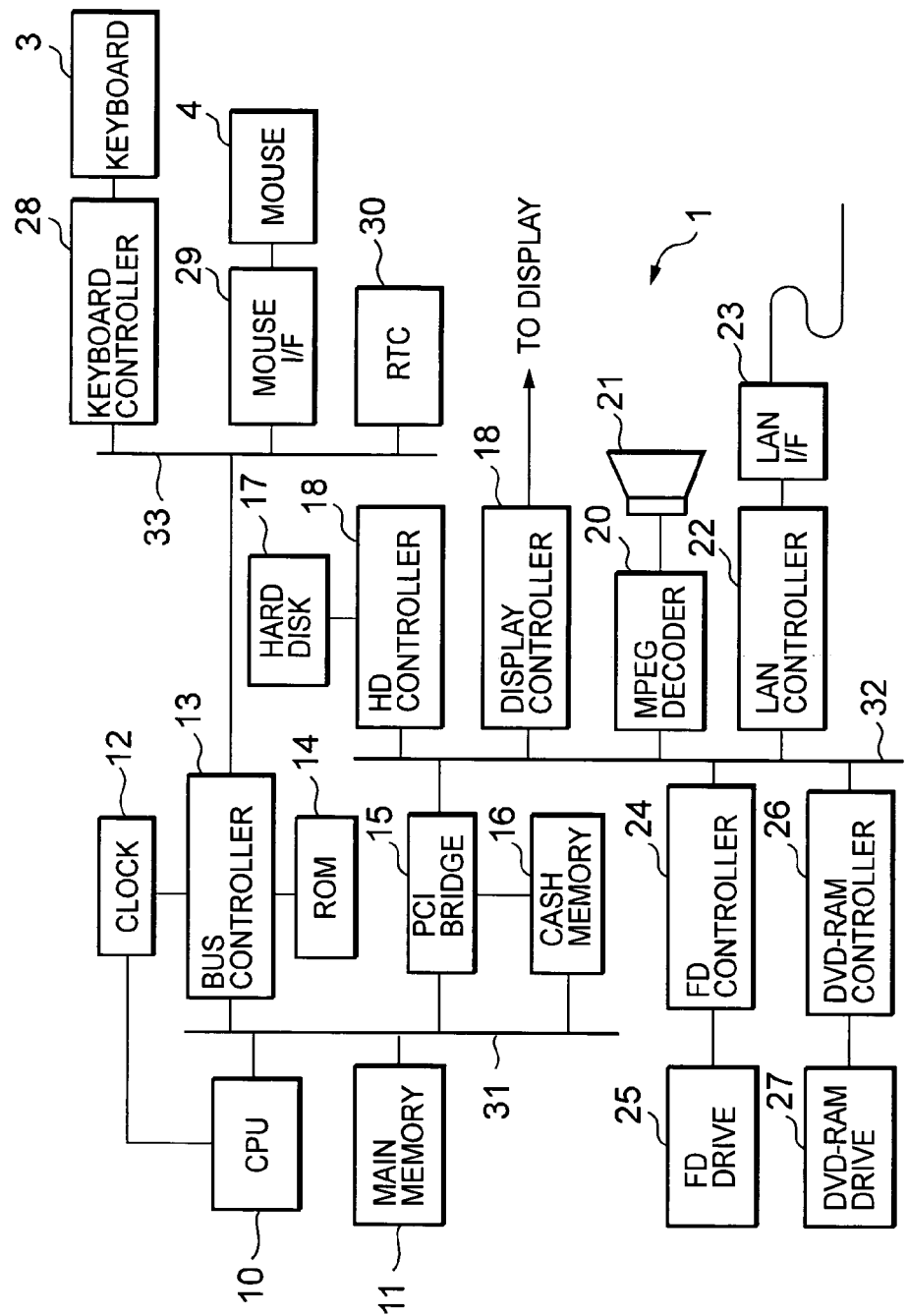
FIG. 2 is a diagram illustrating a computer that includes a memory so that a computer program is executed.

Now referring to FIG. 2, the PC 1 further includes a central processing unit CPU 10, a main memory unit 11, a clock unit 12, a bus controller 13, a Read Only Memory ROM 14, Peripheral Component Interconnect (PCI) Bridge 15, a cash memory unit 16, a hard disk 17, a hard disk controller 18, a display controller 19, a moving picture experts group decoder 20, a speaker 21, a LAN controller 22, a LAN interface (I/F) 23, a floppy disk controller 24, a floppy disk drive 25, a digital video versatile disk random access memory (DVD-RAM) controller 26, a DVD-RAM drive 27, a keyboard controller 28, a mouse I/F 29, a real time clock (RTC) 30, a CPU bus 31, a PCI bus 32 and X bus 33. The CPU executes a control process program from the ROM 14 as well as various application programs and an operating system program that are read into the main memory 11 from the hard disk 17. The main memory 11 further includes a dynamic random access memory (DRAM) that is used as a work area.

Still referring to FIG. 2, the PC 1 further includes the following components. The clock 12 further includes a crystal oscillator and a frequency divider circuit and generates clock signals that control the CPU 10 and the bus controller 13. The bus controller 13 in turn controls the data transfer on the CPU bus 31 and the X bus 33. The ROM 14 stores control programs for a system start-up and various devices. The PCI bridge 15 transfers data between the PCI bus 32 and the CPU 10 via the cash memory 16. The cash memory 16 is implemented by DRAM and is used by the PCI bridge 15. The hard disk 17 stores the system software, various application programs and user data. The HD controller 18 has an interface unit such as integrated device electronics (IDE) for the hard disk 17 and transfers data at a high speed. Furthermore, as will be explained later, the hard disk 17 also stores a table containing RGB data that correspond to the Munsell color-order system.

As will be described later in detail, a preferred embodiment utilizes the Mulssel color system and stores the mapping information for the RGB display in the hard disk storage 17. That is, the Mulssel color system specifies a color based upon a set of hue, lightness and saturation values, and the three dimensional coordinates in the Mulssel system correspond to the above set of the values. The three dimensional coordinates, set of hue, lightness and saturation values as well as the RGB display values are all stored in the 1:1 corresponding manner in the hard disk storage 17.

The display controller 19 converts character data and graphics data in a digital format to an analog format and exert controls on these data in order to display on a display screen 2a of the color display 2. The operation and the components of the display controller 19 will be later described. The MPEG decoder 20 decodes data in MPEG files that are stored in the hard disk 17 and DVD-RAM via DVD-RAM drive 27. The decoded YUV video data is in the ratio of Y:U:V=4:2:2. The MPEG decoder 20 outputs the decoded YUV video data to the display controller 19 while it converts the decoded audio data in a digital form to an analog form before outputting the analog audio signal to the speaker 21. In the decoded YUV video data, Y represents an intensity component while U and V represent chroma. U=B (blue)−Y, V=R (red)−Y.

The LAN controller 22 is, for example, compatible with IEEE 802.3 communication standard protocol (Institute of Electrical and Electronics Engineers) and controls communication to other devices connected to the Ethernet via LAN I/F1 23. The FD controller 24 transmits data to the FD drive 25. The interface between DVD-RAM controller 26 and DVD-RAM drive 27 is for example Small Computer System Interface-2 (SCSI-2), and the data is transferred. The keyboard controller 28 connects serial data that is imputed via keyboard to parallel data. The mouse I/F 29 has a mouse port and is controlled by a mouse driver or a control program. RTC30 is a time date clock and is backed up a battery that is not shown.

Figure 3:
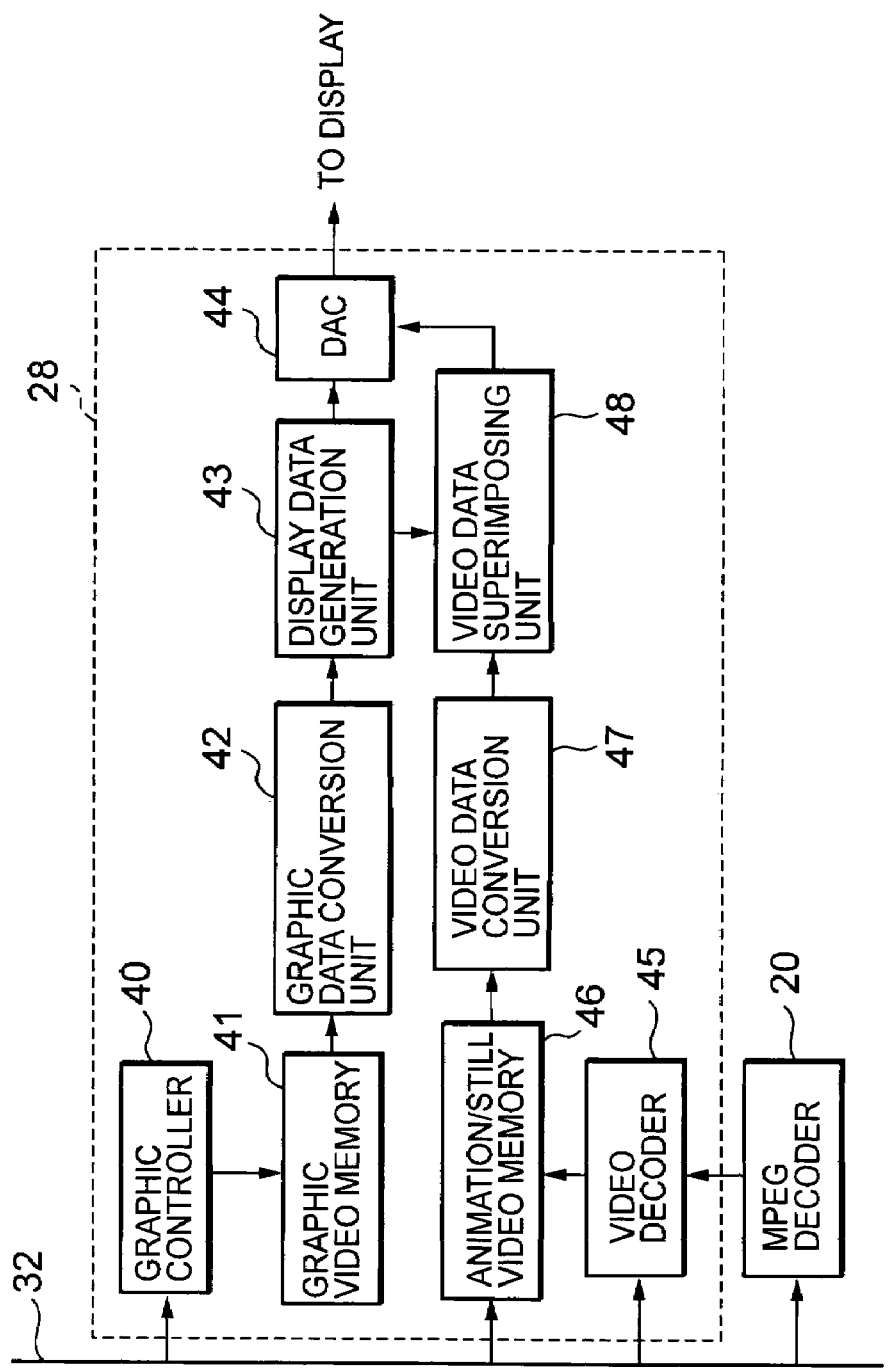
FIG. 3 is a diagram illustrating the display controller according to the current invention.

The display controller 19 is a major component of the color display control device. The operation and the components of the display controller 19 will be described below. Referring to FIG. 3, the display controller 19 includes a graphics controller 40, a graphics video memory 41, a graphics data conversion unit 42, a display data generation unit 43, a digital-to-analog connecter (DAC) 44, a video coder 45, animation/graphics video memory 46, a video data connector 47 and a video data superimposing unit 48. The graphics controller 40 maintains a plurality of display planes or user planes that the CPU has access. For example, a first plane is a background while a second plane is an image plane containing characters and graphics. These two planes are maintained as separate user planes. The graphics controller 40 generates display data according to commands for font data or graphics from the CPU 10. For example, upon receiving a black fill command from the CPU 10, the graphics controller 40 generates data in a specified color for every pixel in a specified area. These data represent each pixel by red R, green G, blue B and intensity I, and a single bit represents each of the R, G, B and I. The graphics controller 40 superimposes the user planes such as a background color, characters and lines.

The graphic video memory 41 is a video random access memory (VRAM) and has separate R, G, B and 1-bit planes. The graphics data conversion unit 42 reads 8 pixels or 32 bits of data from the graphics video memory 42 and converts to 8-bit data/pixel using an internal color pallet. The display data generation unit 43 reads one pixel on 8-bit data from the graphics data conversion unit 42. Based upon an internal color look-up table, the display data generation unit 43 generates 6-bit data for each of R, G and B per pixel. When video data is displayed by superimposing on others, the above generated data is outputted to the video superimposing unit 48. Otherwise, the above generated data is outputted to the DAC 44. The DAC 44 converts each of the digital data R, G and B to analog image signals and outputs to the color display 2.

The video decoder 45 converts to 8-bit data for each R, G and B for each pixel from the YUV video data from the MPEG decoder 20 or the YUV video data for a still image such as JPEG that is decompressed by software and the CPU 10. The animation/still video memory 46 is VRAM and includes the separate R, G and B planes. The video data conversion unit 47 converts 8-bit R, G and B data to 6-bit data based upon the internal conversion table. The video data superimposing unit 48 superimposes the R, G and B data from the display data generation unit 43 over the video data from the video data conversion unit 47. Otherwise, the video superimposing unit 48 takes logical OR for each bit of the above data and outputs the result to the DAC 44.

The display controller 19 has the following operations depending upon a type of the data or superimposition of the data. In summary, the processing by the display controller 19 is categorized into groups of A. characters or graphics without animation or still images, B. animation, C. still images and D. characters or graphics to be superimposed or animation or still images. For the group A characters or graphics without animation or still images, the processing flow includes from the PCI bus 32 via the graphics controller 40, the graphics video memory 41, the graphics data conversion unit 42, the display data generation until 43, the DAC 44 to the color display 2. For the group B. the animation data, the processing flow includes from the MPEG decoder 20, via the video decoder 45, the animation/still video memory 46, the video data conversion unit 47, the video data superimposing unit 48, the DAC 44, to the color display 2. For the group C. the still image data, the processing flow includes from the PCI bus 32, via the video decoder 45, the animation/still video memory 46, the video data superimposing unit 48, the DAC 44, to the color display 2. For the group D. the characters or graphics to be superimposed on animation or still image, the processing flow includes from the PCI bus 32, the graphics controller 40, the graphics video memory 41, the graphics data conversion unit 42, the display data generation unit 43, the video data superimposing unit 48, the DAC 44 to the color display 2.

Figure 4:
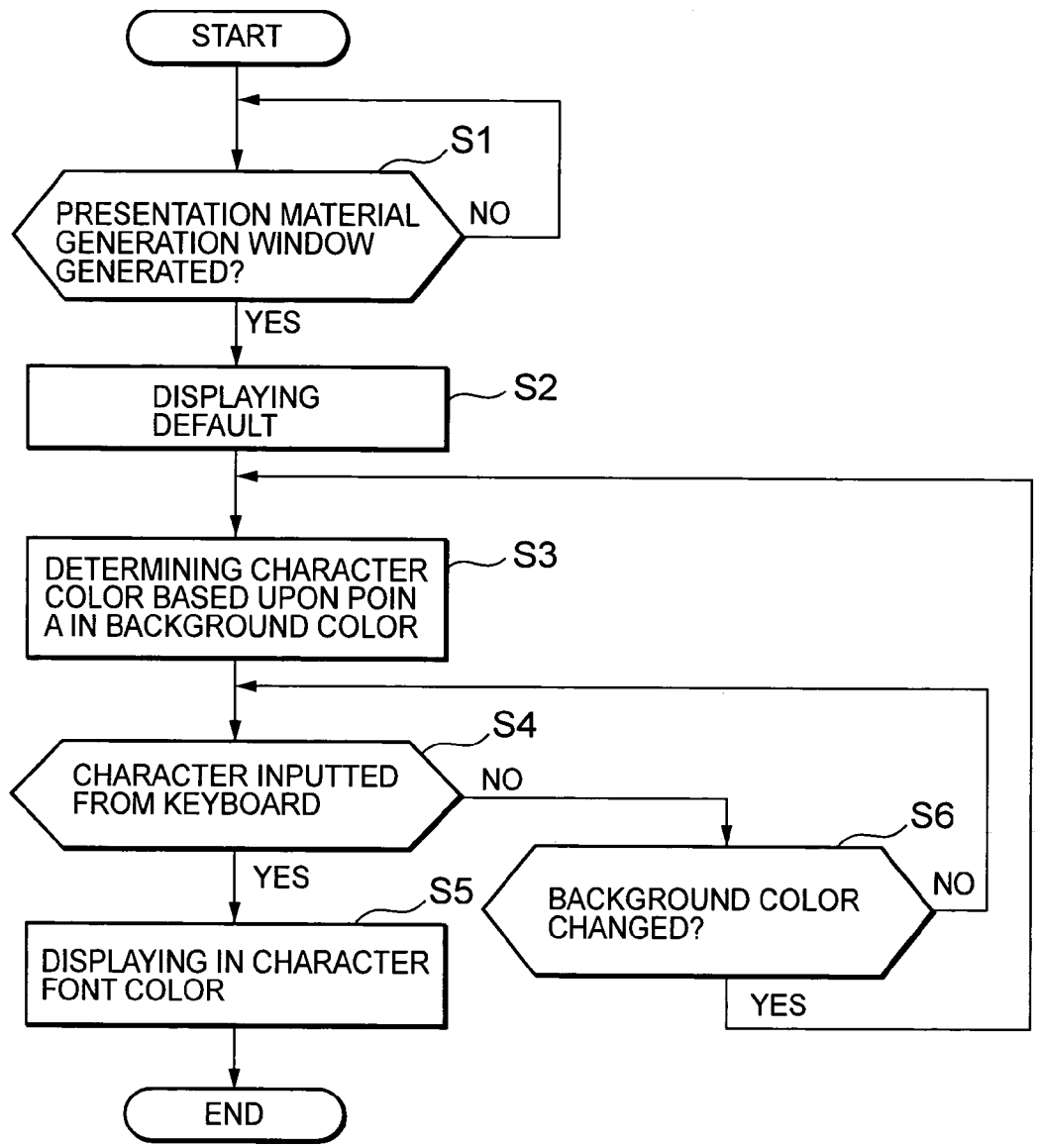
FIG. 4 is a flow chart illustrating the steps involved in one preferred process of the display control according to the current invention.
Figure 5:
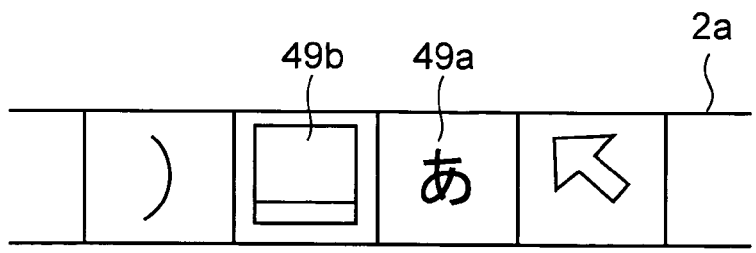
FIG. 5 is a diagram illustrating icons in the presentation material generation window on the display unit.

Referring to FIG. 4, a flow chart illustrates the steps involved in one preferred process of the display control according to the current invention. To simplify an exemplary process, no animation, nor still image is involved for the character or graphics display using the personal computer 1 and the CPU 10 in particular. In a step S1, it is determined whether or not a presentation material window is generated. This determination is to check if an application program for generating presentation material has started based on the user operation. At this time, as shown in FIG. 5 in the presentation material generation window on the display 2, icons such as a character icon 49a for selecting a character color and a background color icon 49b for selecting a background color are displayed. If the presentation material generation window is generated, the CPU 10 displays a predetermined default background color in the display 2 via the graphics controller 40 and the display controller 19 in a step S2. In the step S2, the CPU 10 identifies a point A in the Munsell color-order system for the above default background color. At the same time, by referring to the 1:1 correspondence RGB-Munselle color system table that is stored in the hard disk 17, the Munselle color values are determine based upon the RGB data, and by the Munselle color value −3D coordinate table, the coordinates in the Munsell color-order system are determined for the point A. The CPU 10 performs the above described step S2 or functions as a device for the same.

The CPU 10 determines a point B based upon the point A according to a predetermined calculation that will be described later. Based upon the point B, the character color or image color is determined for the background color and the character or the image is superimposed in the above determined color in a step S3. BY referring to the 1:1 correspondence RGB-Munselle color system table, the three dimensional coordinates in the Munsell color-order system are converted to the RGB valves. The CPU 10 performs the above described step S3 or functions as a device for the same. Under the above conditions, it is determined in a step S4, whether or not any character input exists from the keyboard 3. If the character input exists in the step S4, the CPU 10 outputs a command specifying the selected font color to the graphics controller 40 and displays the via the display controller 18 the characters in an easily perceived color with respect to the background color on the display screen 2a in a step S5.

When there is no keyboard input in the step S4 but the background color is charged in a step S6 by selecting the background color icon 46b, similarly to the above described steps, the CPU 10 determines a character color based upon the point A for the altered background color in the Munsell color-order system in accordance with the predetermined calculation as described with respect to the step S3. The CPU 10 outputs a command specifying the selected font color to the graphics controller 40 and displays via the displays via the display controller 19 the characters in an easily perceived color with respect to the background color on the display screen 2a as in the step S5. As described above, even if the background color is charged, the characters are always seen in an easily perceived color.

Figure 6:
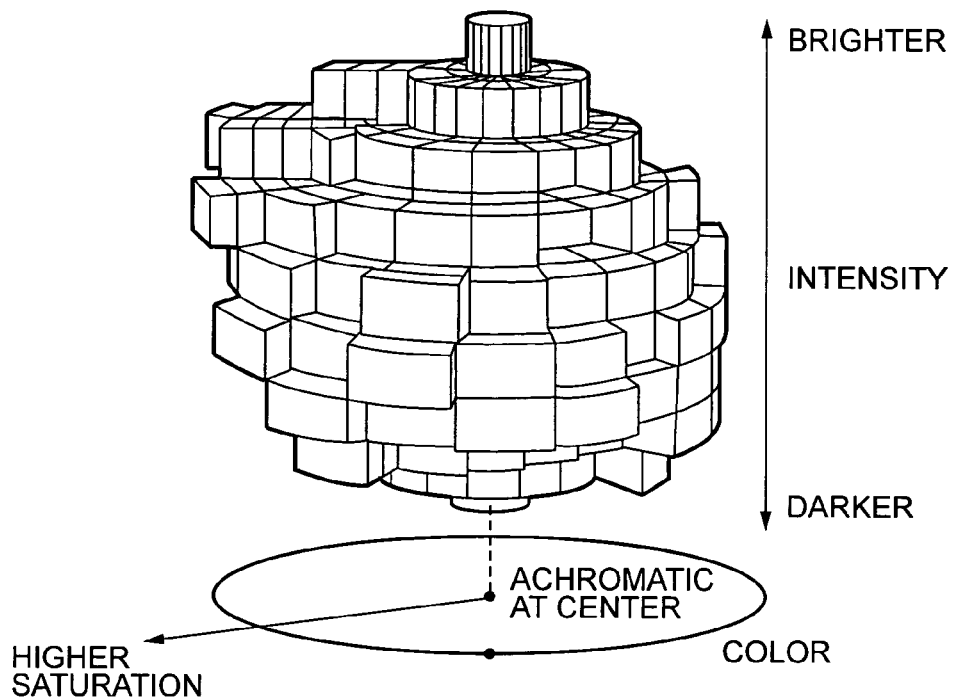
FIG. 6 shows lightness, saturation and hue in a three dimension representation.
Figure 7:
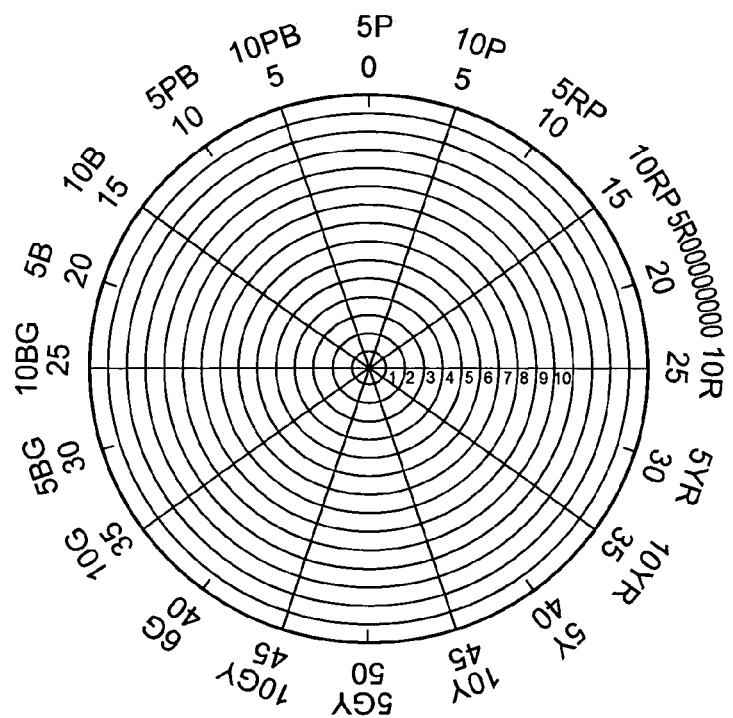
FIG. 7 illustrates sections of the Munsell color-order system that are sliced perpendicularly to the achromatic axis.

Referring to FIGS. 6 and 7, a preferred embodiment or process of determining an easily perceived character color as described in the step S3 according to the current invention uses the Munsell color-order system. FIG. 6 shows lightness, saturation and hue in a three dimension as described in "From Beginners to Professional Color Encyclopedia"

(1993). A vertical axis represents lightness or intensity of colors, and the lightness is represented to be higher or brighter in a positive direction. The centrally located vertical axis represents an achromatic axis or a zero saturation point in the three dimensional representation. Saturation of colors is thus represented by a horizon axis that is perpendicular to the lightness axis. As being away from the achromatic axis, the saturation of a give color becomes higher. Lastly, with respect to a given point on the circumference of the three dimensional body, color or hue of colors is represented.

FIG. 7 illustrates sections of the Munsell color-order system that are sliced perpendicularly to the achromatic axis as described in "Interesting Color Story" published by Japanese Industrial Newspaper (1991).

Figure 8:
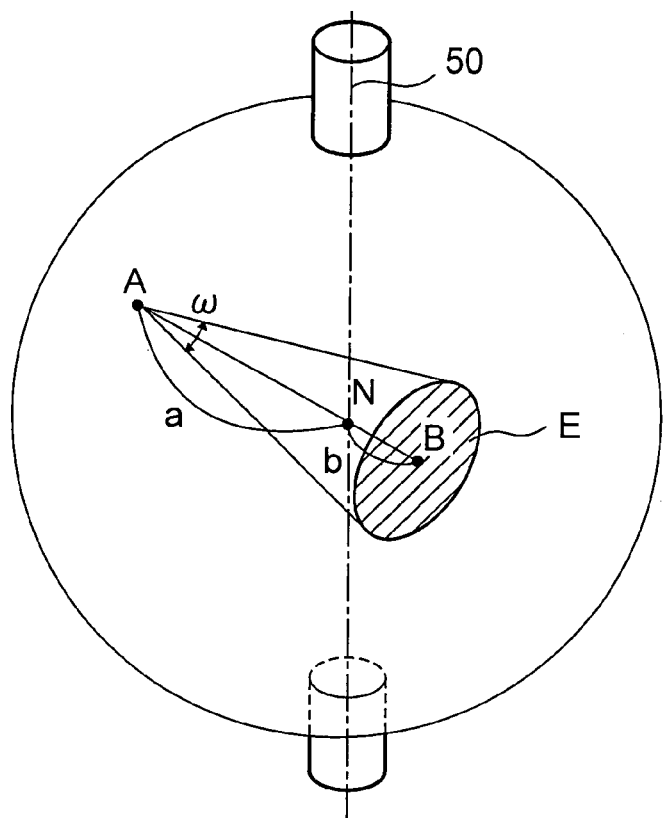
FIG. 8 is a diagram illustrating a method of selecting a font color based upon the background color according to the current invention.

FIG. 8 is a diagram illustrating a method of selecting a font color based upon the background color according to the current invention. The Munsell color-order system is illustrated as a sphere for simplification and includes an achromatic axis 50 and a zero saturation point N on the achromatic axis 50. The point N is also at a mid point of the lightness range 0 through 10 at the lightness level of 5. When an arbitrary point A in the Munsell color-order system is selected as a background color based upon a color expert, and an optimal color is selected for the background color within a range E or with in a predetermined range from a point B. A relative distance "a" is defined as a distance between the point A and the point N while a relative distance "b" is defined as a distance between the point B and the point N. The point B is selected so that an inter-point line AB perpendicularly intersects the achromatic axis at the point N. The point B is also selected at a point where the a to b ratio is equal to or over 4 to 1. That is, if the relative distance b between the mid point N and the point B is set to 1, the distance a between the point N and the point A is equal to or over 4. Furthermore, the angle ω between range limiting lines with respect to the perpendicularly intersecting line AB is 15 at the point A to form a circular area at the point B on a plane that is perpendicular to the line AB for representing a range E where an optimal color is selected. The 15-degree angle means a range that covers three colors including the adjacent two colors and the color itself and the range also means the same color for human perception.

Figure 9:
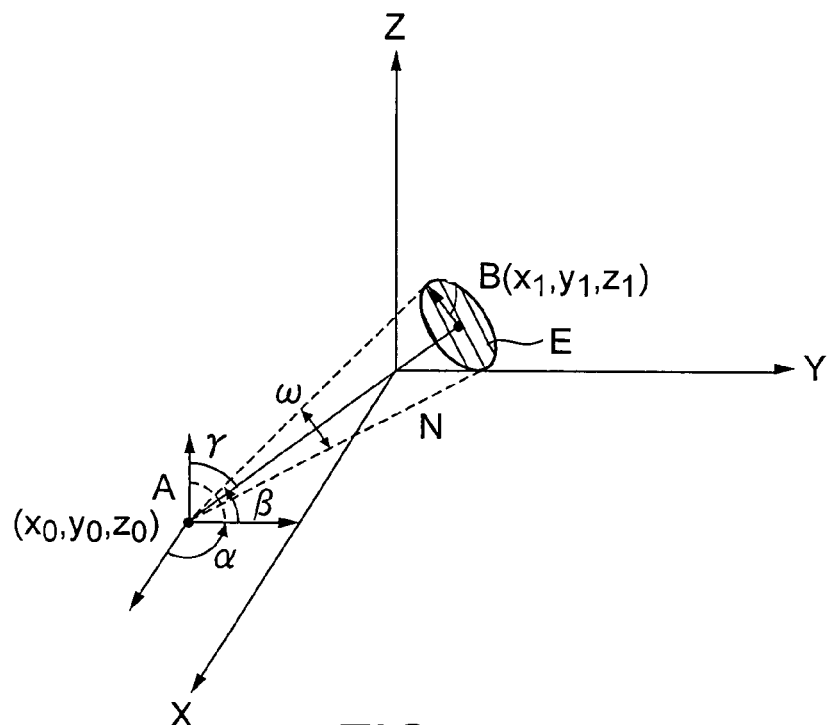
FIG. 9 shows that the center of the Munsell color-order system representation is used as an origin in the three dimensional coordinate.
Figure 10:
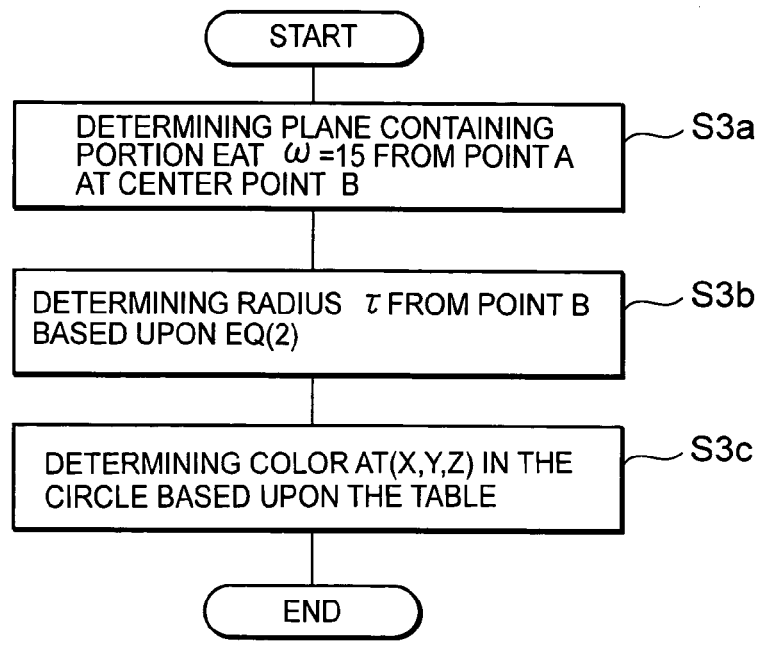
FIG. 10 is a flow chart illustrating the steps involved in a preferred process of determining the font color according to the current invention.

Referring to FIGS. 9 and 10, a method of determining the point B and the range E for the angle ω at the point B will be described. FIG. 9 shows that the center of the Munsell color-order system representation is used as an origin in the three dimensional coordinate, and the mid point N is on the origin (X=0, Y=0, Z=0). The point A is (X0, Y0, Z0) while the point B is (X1, Y1, Z1) as shown in FIG. 9. Since the point N is at the origin of the three dimensional coordinate, the line AN has the length and the vector AN. That is, the vector AN=

$$AN = \begin{pmatrix} -X0 \\ -Y0 \\ -Z0 \end{pmatrix}.$$

If the line AN: the line BN=4:1, since the point B is at 5/4 of the vector AN, the point B (X1, Y1, Z1) has X1=−5X0/4, Y1=−5Y0/4, Z1=−5Z0/4. The line AB and the X axis, the Y axis as well as the Z axis respectively form an angle α, an angle β and an angle γ. Based upon the textbook geometry, λ=cos α, μ=cos β, ν=cos γ. If the line AB has the length R, cos=α=(X1−X0)/R, cos β=(Y1−Y0)/R, cos γ=(Z1−Z0)/R.

Based on the above relationships, X1−X0=λR, Y1−Y0=μR, Z1−Z0=νR are obtained, since $(X1-X0)^2+(Y1-Y0)^2+(Z1-Z0)^2=R^2$. The plane including the range E from the point B is expressed by the following equation (1):

$$\lambda X + \mu U + \nu Z = \sqrt{\{(X1-X0)^2+(Y1-Y0)^2+(Z1-Z0)^2\}} \quad (1).$$

The predetermined range E is on the plane as expressed by the equation (1) and is with in a radius r from the point B and the plane is limited by ω=15. From the equation (1), $$\tan(\omega/2) = r/\sqrt{\{(X1-X0)^2+(Y1-Y0)^2+(Z1-Z0)^2\}} \quad (2).$$

From the equation (2), the radius r is determined based upon the coordinate of the point A (X0, Y0, Z1). Within the range E, colors are specified by coordinates (X, Y, Z) within the radius r from the point B, and these colors are candidates for the font or pen color. Subsequently, the three dimensional coordinate data is connected into the color value and then to the RGB color data by referring to the conversion tables that are stored in the hard disk as described above.

Referring to FIG. 10, a flow chart illustrates the steps involved in a preferred process of determining the font color according to the current invention. In a step S3a, a plane containing a range E with ω=15' from the point A at the point B as the center is derived from the equation (1). The radius r is derived from the equation (2) in a step S3b, and the color at the coordinate (X, Y, Z) is determined in a step S3c within the radius r from the point B based upon the predetermined mapping tables. According to appropriate perception based upon color experts' experience, when the background color at the image display position is represented on the line between the point A and the mid point N in the Munsell color-order system, a color is selected for display within a range of colors from the point B that is positioned at a ¼ location with respect to the mid point N in comparison to that of the point A in the Munsell color-order system. By the above method, a display color is best selected without human intervention for easy viewing and optimizing the identification of the display image. Although the font or pen color is automatically selected against the background color as described above, the selected font color is optionally modified by the character icon 49a.

When characters or graphics are superimposed on animation or still image as a background, the most commonly used color in the entire image is treated as its background color and the above described process is performed. The characteristic color of the image is checked based upon the RGB data that has been inputted in the animation/still video memory 46. For example, a color of each pixel is grouped into a predetermined number of similar representative colors based upon similarity, and the most predominant representative color is considered as a background color in order to select an optimal font color. Using the above described font color determination method, words for a song to be superimposed on the image are easily seen in a display color in a karaoke device.

The above described operation is not limited to windows such as a presentation material generation window but is applicable to any display screen. Similarly, the above described method is not limited to characters but is automatically applicable to other display images such as straight lines and rectangular lines. In the alternative, the above described operation is performed by having a personal computer read and execute a program that is stored in a FD or DVD-RAM. For example, as shown in FIG. 2, a computer includes a memory such as ROM 14, FD, DVD-RAM so that a computer program is executed. In particular, an application program includes a control program to execute a variety of operations with respect to a recognition means, a calculation means, and a display color determination means as described in the preferred embodiment. The control programs are stored in storage unit such as DVD-RAM and are previously installed in ROM 14 or a hard disk 17. Upon boot strapping, a copy of the control program is copied and is read by the CPU 10. Since the CPU 10 reads a variety of programs and executes a corresponding process, a personal computer 1 implements the preferred embodiment of the color display control device and process according to the current invention.

Figure 11:
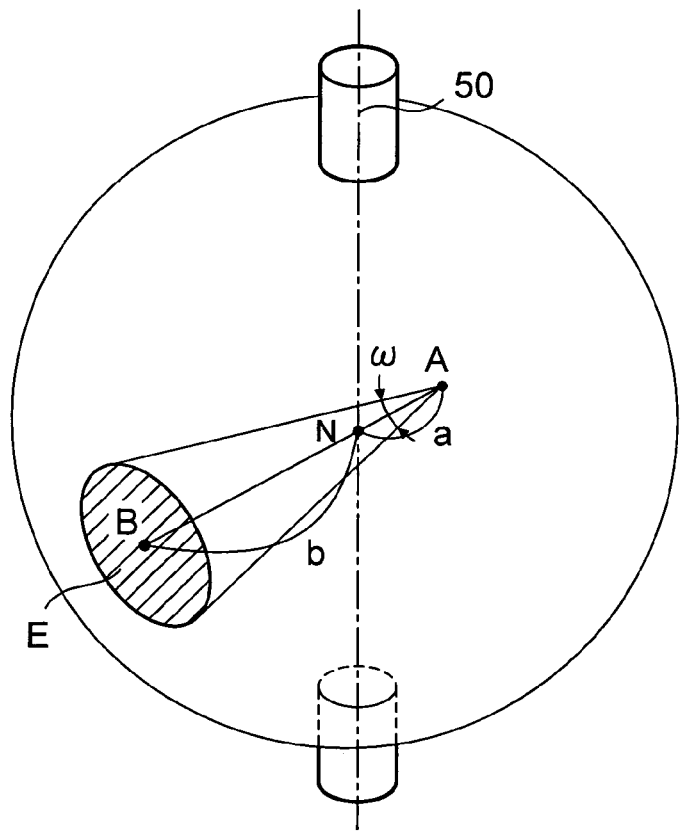
FIG. 11 is a diagram illustrating a second preferred embodiment of the color font display optimization system according to the current inventions.

Referring to FIG. 11, a diagram illustrates a second preferred embodiment of the color font display optimization system according to the current inventions. Since the same reference numerals refer to the substantially same components of the first preferred embodiment, the description will be abbreviated for the second preferred embodiment.

When an arbitrary point A in the Munsell color-order system is selected as a background color based upon a color expert, an optimal color is selected for a background within a range E from a point B which is located at a point where the b-to-a ratio is over 4 to 1. The point A is determined so that the distance b between the point N and the point B is equal to or over 4. Furthermore, the range E is formed on a plane at the point B and is perpendicular to the line AB. The angle ω at the point B towards the point A is 15 degrees to limit the plane within the range E for selecting the color. The 15-degree angle limitations means a range that covers three colors including the two adjacent colors and the color itself, and the range also signifies the same color for human perception. That is, the point A and the point B are relative in their position. The second preferred embodiment has the opposite position of the point A and the point B.

According to the appropriate perception of the color experts experience, when the background color at the image display position is represented at a point on the line between the point A and the mid point N in the Munsell color-order system, a color is selected for display with in a range of colors from the point A that is positioned at ¼ location with respect to the mid point N in comparison to that of the point A in the Munsell color-order system. By the above method, a display color is best selected without human intervention for easy viewing and optimizing the identification of the display range.

Figure 12:
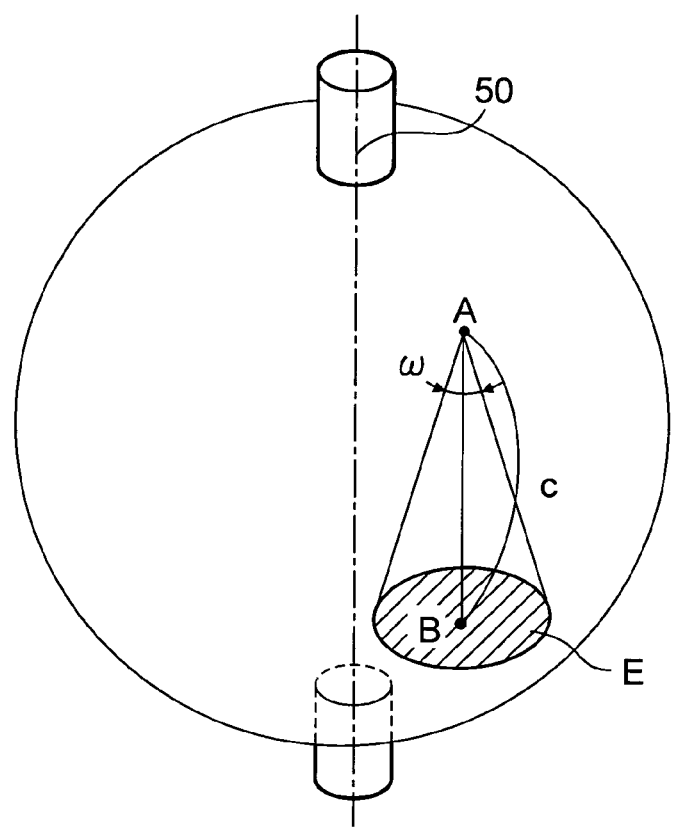
FIG. 12 is a diagram illustrating a third preferred embodiment of the color display optimizing system according to the current invention.
Figure 13:
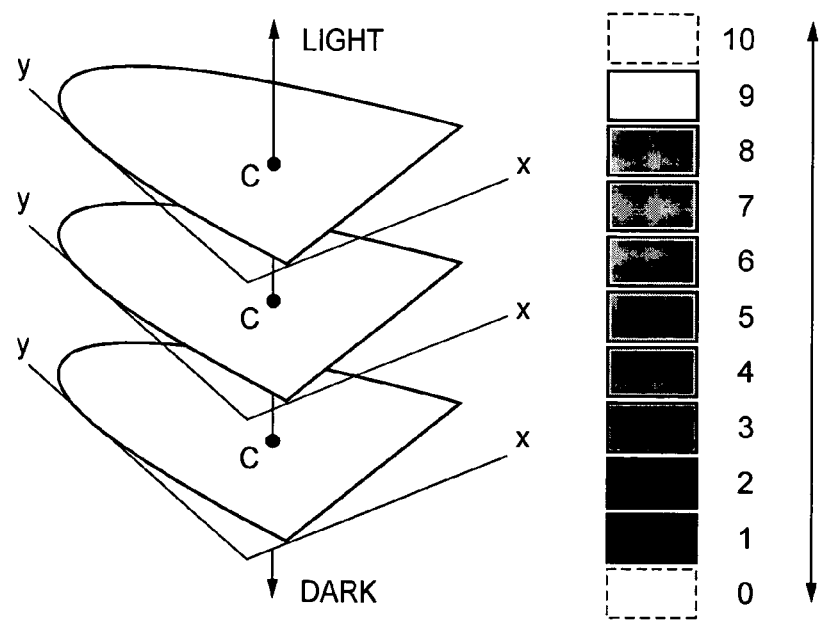
FIG. 13 is a diagram representing the lightness in ten stages.

Referring to FIGS. 12 and 13, diagrams illustrate a third preferred embodiment of the color display optimizing system according to the current invention. The preferred embodiment calculates the position of the point B that is within a range E away from the point A by over four in the lightness directions that is selected as a background color in the Munsell color-order system. The line formed by the point A and the point B is parallel to an axis so indicative of achromatic. The range E formed on a plane at the point B and perpendicular to the line AB. The point B and the colors in the range E signify an optimal color against the background color. Furthermore, the range E is limited by an angle ω=15° formed at the point B towards the plane range E and ½ω set on with respect to the line AB on either side. The angle ω means to include two adjacent colors and the color itself, that are perceived as a single color for human perception.

For the background color for display characters that is the point A in the Munsell color-order system, the point B may not exist in the first or second preferred embodiments. In that case, however, as shown above with the third embodiment, a color is automatically selected as an appropriate display color with in a range of the perceptibly same color from the point B that is located over 4 or more in the lightness difference from the point A to provide sufficient distinction by a clear difference in lightness. That is, as described with respect to FIG. 13, the lightness is shown in ten stages from the lightness 10 being completely white to the lightness 0 being completely black. When an image color and a background color have a difference of four in lightness, they appear to have sufficient visual distinction even if they have the same saturation and hue.

Figure 14:
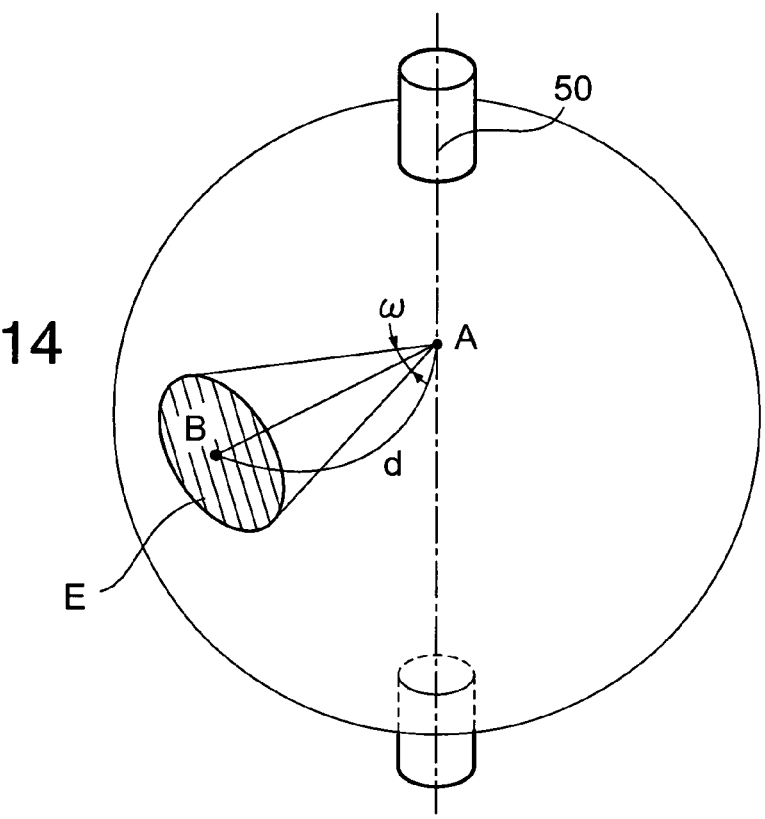
FIG. 14 is a diagram illustrating a fourth preferred embodiment of the optimal image color selection system according to the current invention.
Figure 15:
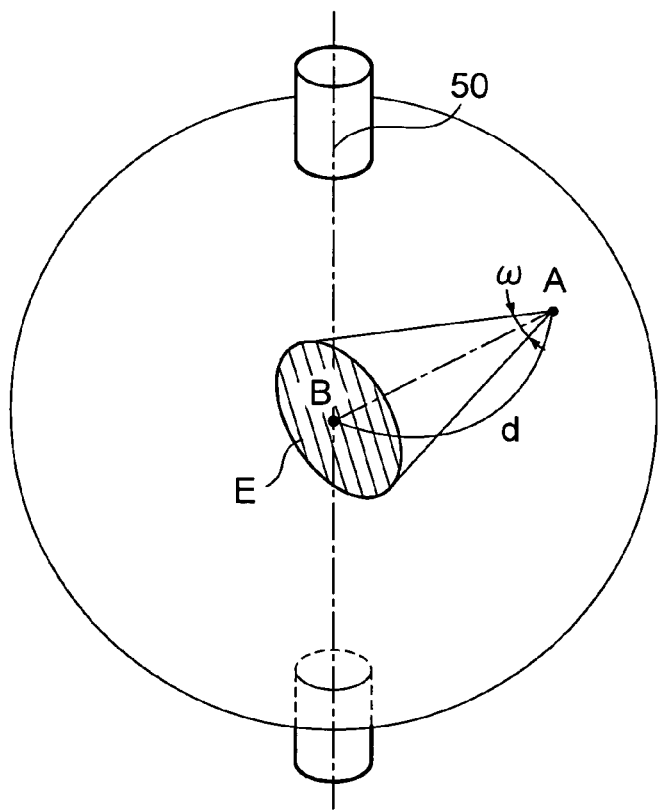
FIG. 15 is another diagram illustrating the fourth preferred embodiment of the optimal image color selection system according to the current invention.

Referring to FIGS. 14 and 15, diagrams illustrate a fourth preferred embodiment of the optimal image color selection system according to the current invention. The preferred embodiment calculates the position of the point B that is within a range E but is over 4 in lightness away from the point A that is selected as a background color in the Munsell color-order system. The line formed by the point A and the point B is perpendicular to an achromatic axis 50. The range E is limited by an angle ω=15° formed at the point B towards the plane range E, and ½ω set on with respect to the line AB on either side of the line AB on either side of the line AB. The angel ω=15° means to include two adjacent colors and the color itself that are perceived as a single color for human perception. Although the point B may not exist as shown in the first and second preferred embodiments depending upon the point A in the Mussel color system, an appropriate image display color is automatically selected to distinguish on the saturation difference for clear visual display. When the point A exists on the achromatic axis 50, the appropriate display color is selected from the range E within the difference of 4 in saturation from the point B which forms a line AB that is perpendicular to the achromatic axis 50. Referring specifically to FIG. 15, the point A exists on the achromatic axis 50, and the above described criteria are still applicable.

Figure 16:
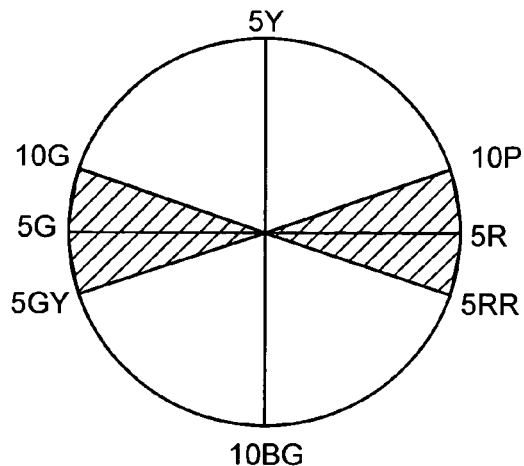
FIG. 16 is a diagram illustrating a certain aspect of a fifth preferred embodiment of the optimal image color selection system according to the current invention.
Figure 17:
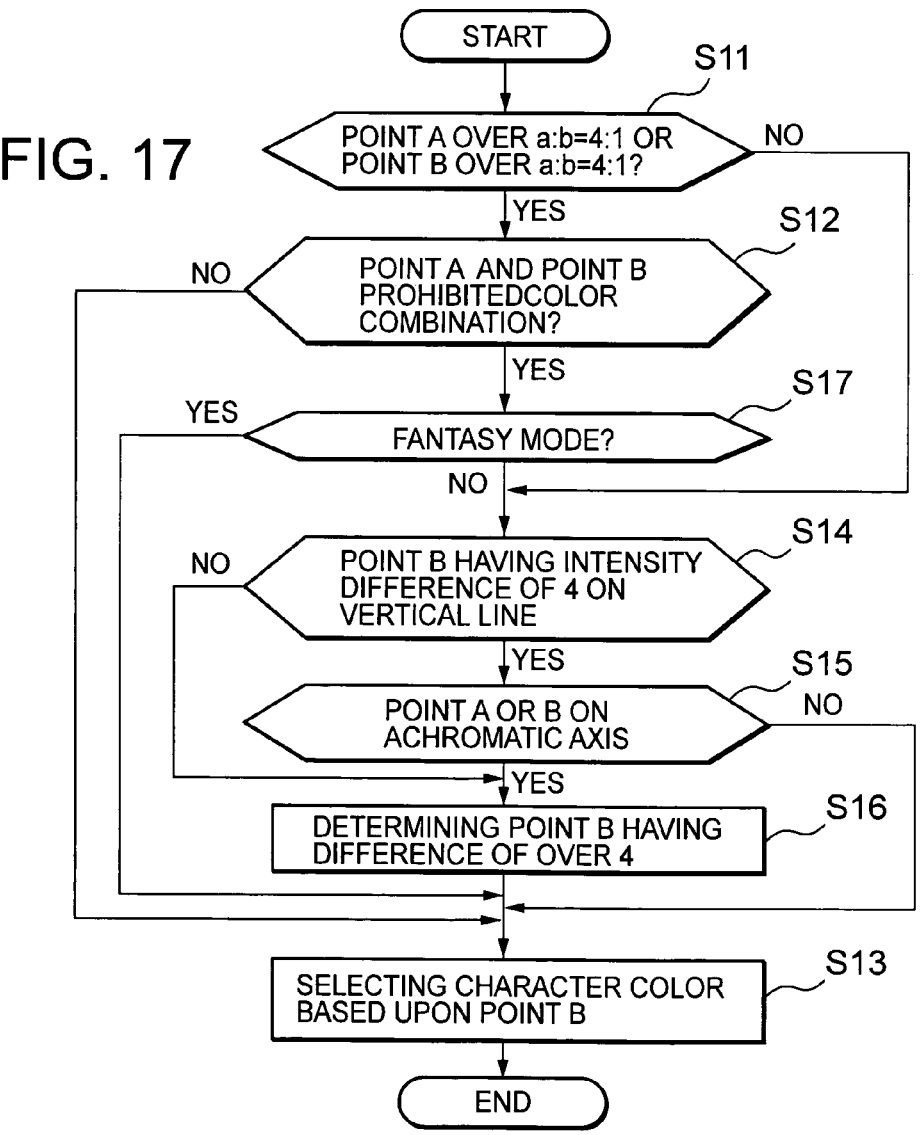
FIG. 17 is a flow chart illustrating steps involved in the fifth preferred embodiment of the optimal image color selection system according to the current invention.

Now referring to FIGS. 16 and 17, a diagram and a flow chart illustrate a fifth preferred embodiment of the optimal image color selection system according to the current invention. The fifth preferred embodiment is essentially identical to the first and second embodiments except for excluding a process to select a display color based upon the point B when the points A and B belong to a predetermined combination of colors. That is, for example, a certain set of colors such as shades of pink is not appropriate in the image or background colors for business presentations using a color display 2. The predetermined colors or certain combinations of predetermined colors are excluded from the color display. Referring particularly to FIG. 16, a shaded range indicates a predetermined combination of colors such as 5RR (red-purple), −10(green), 5R (red), −5G, 10P (purple) and −10GY (green yellow) in the Mussel color chart. This color range is excluded from the first and second preferred embodiments. In the fifth preferred embodiment, the process as described in the third and fourth preferred embodiments is preformed to select an image or display color.

FIG. 17 illustrates steps involved in the preferred process of the image display color selection. In a step S11, after a point A as a background color is identified in the Munsell color-order system, it is determine whether or not a point B exists with respect to the point A in such a way that a:b=4:1 or over in the Munsell color-order system as described with respect to the first preferred embodiment. Alternatively, it is determined whether or not the point B exists with respect to the point A in such a way that a:b=1:4 or over in the Munsell color-order system as described with respect to the second preferred embodiment. When the above point B exists, it is determined in a step S12 whether or not the relationship between the colors indicated by the points A and B is one of the predetermine color combinations as shown in FIG. 16. The decision is either a step or a device that performs the same function. One implementation of the step is to refer to a table of the predetermined undesirable color combinations that is stored in the hard disk 17 in order to make the above determination. An image display color is selected based upon the point B. If the points A and B fail to represent one of the predetermined prohibited color combinations is a step S13. On the other hand, if the points A and B represent one of the predetermined prohibited color combinations, it is determined in a step S14 whether or not the point B exists at a point that is perpendicular to the point A and represents a four degree of difference in saturation from the point A as described with respect to the third preferred embodiment. If the point B exists in the step S14 and neither the point A or B is on the achromatic axis 50 in a step S15, an image display color is selected based upon the point b in step S13. On the other had, the above described point B does not exist in the step S14 or the point B is on the achromatic axis 50 in the step S15, an image display color is selected based upon the point B in the step B after the point B is calculated to have a saturation degree of four in the step S16. In the preferred process, it is also optionally selectable to have a fantasy mode in which the above described color exclusions are not performed. For example, even if a color combination is a predetermined undesirable color pair, when the fantasy mode is specified via a keyboard in a step S17, an image display color is selected as described with respect to the first and second preferred embodiments. The above fantasy mode is optionally used with a business mode in which a predetermined set of color combinations is prohibited.

Figure 18:
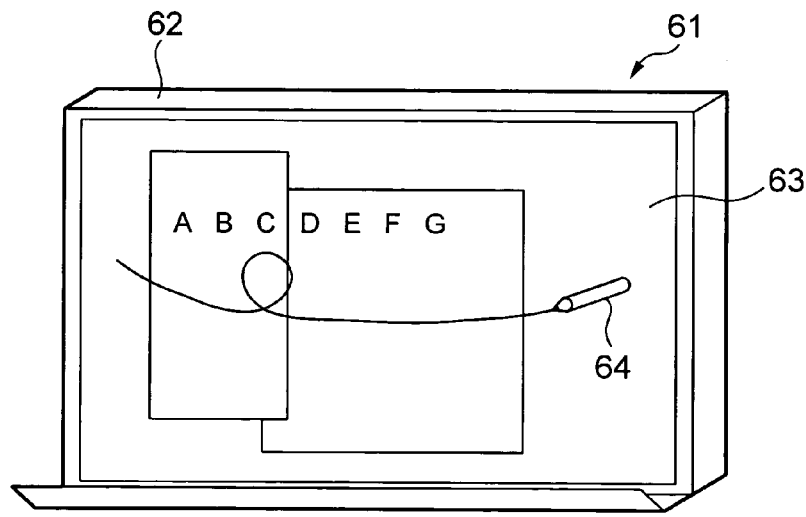
FIG. 18 is a diagram illustrating a sixth preferred embodiment of the image color display selection according to the current invention.
Figure 19:
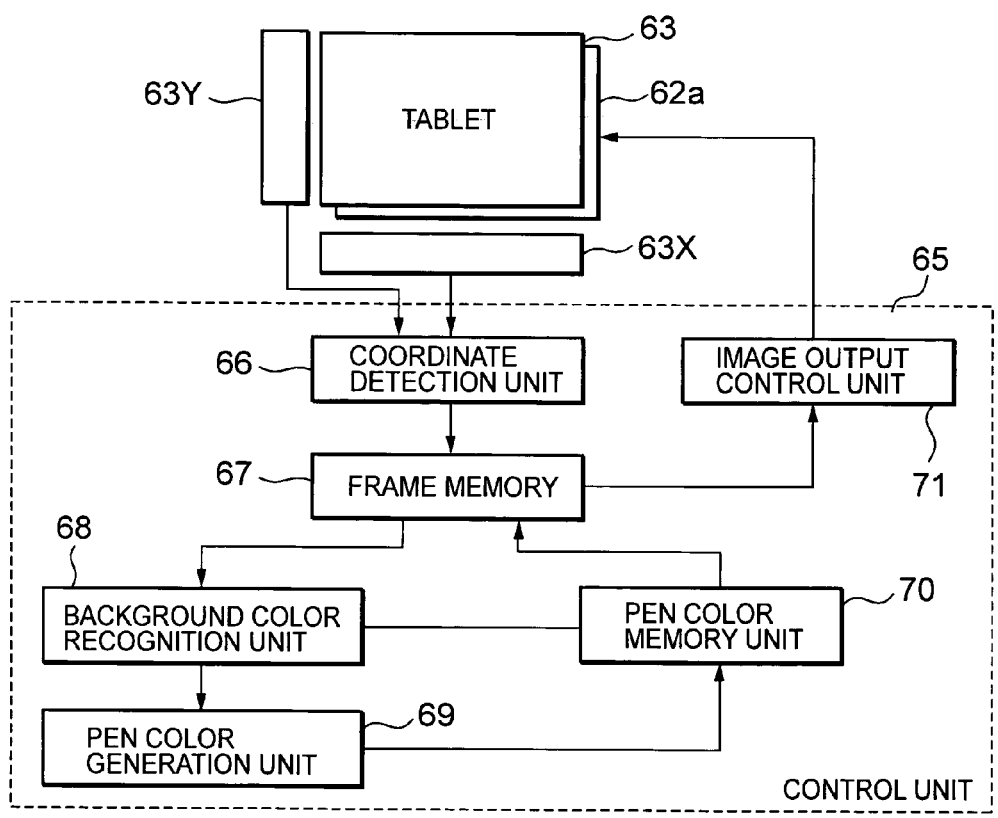
FIG. 19 is a diagram illustrating one exemplary implementation of a color display device.
Figure 20:
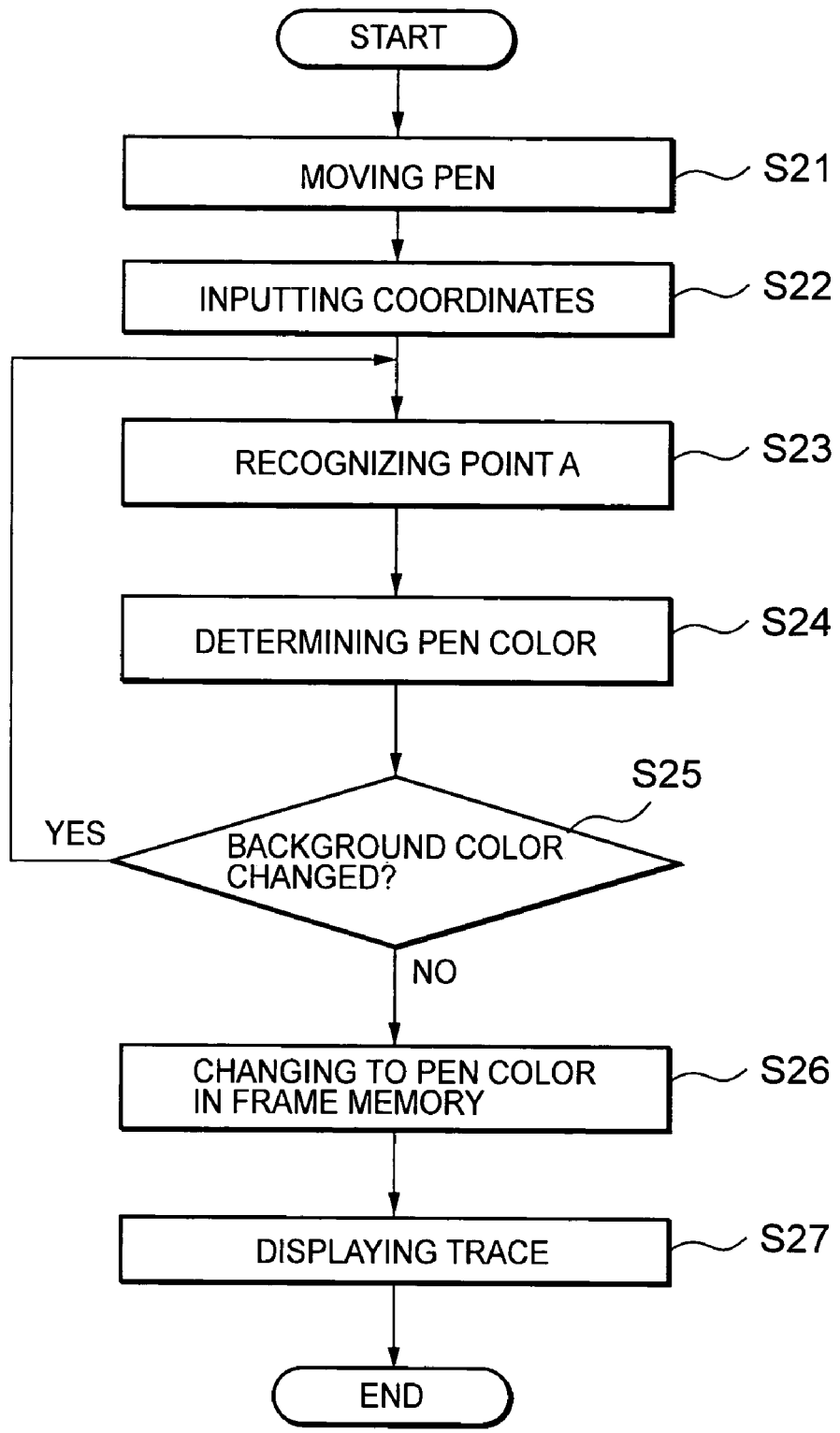
FIG. 20 is a flow chart illustrating steps involved in the sixth preferred embodiment of the optimal image color selection system according to the current invention.

Now referring to FIGS. 18 and 20, a diagram and a flow chart respectively illustrate a sixth preferred embodiment of the image color display selection according to the current invention. Referring to FIG. 19, one exemplary implementation is a color display devices 61 and includes a display panel 62a for displaying characters and images, a tablet 63 for receiving an input signal and an input pen 64 for writing on the tablet 63 as a pointing device. The tablet 63 further includes two layers of parallel electrode 63x and 63y, and the electrically contacted area position is detected upon the pressure from the pen 64. The tablet 63 receives the pressured location of the pen 64 on the color display unit 62 and detects the coordinate via the coordinate detection unit 66. The color display unit 6 displays the trace corresponding to the coordinates detected through the tablet 63. A control unit 65 of the color display device 61 further includes the coordinate detection unit 66, a frame memory unit 67, a background color identification unit 68, a writing color generation unit 69, a writing color storage unit 70 and an image output control unit 71. That is, the above exemplary implementation illustrates an application to the color display device which incorporates the color display unit 61 and the color display control unit 65, thus, the writing color and the display color are the same. The coordinate detection unit 66 continually detects the position of the pen 64 based upon the output signal from the transparent electric terminal 63x, 63y in the tablet 63. The tablet 63 and the coordinates detection unit 66 together implement the coordinate input/detection function. The frame memory 67 stores display information on the coordinate data and the background color. The color background identification unit 68 continuously identifies a background color at the point A in the Munssell color system at the writing coordinate based upon the information in the frame memory unit 67.

The writing color generation unit 69 continuously calculates a writing color for displaying the color writing trace based upon the point 68. The writing color memory storage unit 70 stores a writing display color that has been automatically generated by the writing color generation unit 69. The writing color generation unit 69 and the writing color memory storage unit 70 perform the automatic writing color selection function. The image 20 output control unit 71 reads the coordinate date from the frame memory 67 and displays the inputted trace in an automatically selected pen color on the display panel 62a of the display means 62.

FIG. 20 is a flow chart illustrating steps that are performed by the color display device 61. After characters and diagrams are inputted by contacting the pen 64 on the tablet 63, the coordinate detection unit 66 continuously detects the pen coordinate position of the pen 64 in a step S21, and the detected coordinate data is stored in the frame memory 67 in a step S22. The background color identification unit 68 reads the background color at the coordinates stored in the frame memory 67 and identifies a corresponding point A in the Munssel color system for each coordinate in a step S23. An optimal pen color is determined based upon the point A according to a predetermined calculation method and is stored in the pen color memory unit 70 in a step S24. It is then detected if the background color changes in a step S25. If the background color changes in the step S25, then the steps S23 and S24 are repeated in order to select another pen color that corresponds to the changed background color. On the other hand, if the background color does not change in the step S25, the optimal color stored in the pen color memory unit 70 is placed at a portion corresponding to the coordinate in the frame memory 67 in a step S26. The image output control unit 71 reads the coordinate data from the frame memory 67 and displays the input pen trance at each of the coordinates in the specified pen color in the display panel 62a. As described above, since the pen 64 is automatically selected for a background color at each of the pen coordinates and the color pen trace is displayed in the color display device 62, the inputted characters and diagrams are clearly identified.

The pen color is calculated based upon the Munssell color-order system that expresses intensity, saturation and hue in a three dimensional representation as shown in FIG. 6 and as also disclosed in "Color Encyclopedia From Beginners to Professionals" (1993). The three dimensional representation is sliced and perpendicularly placed with an achromatic axis as shown in FIG. 7 and also disclosed in "Interesting Color Story" Nikkan Kogyo Shimbun, Sep. 26 (1991).

FIG. 8 is a diagram illustrating a method of selecting an optimal pen color that corresponds to the background color, using the Munsell color-order system. The Munsell color-order system is represented by a simplified sphere where a mid point N represents zero saturation and intensity 5 on an achromatic axis 50. Based upon the exert experience, when a point A is arbitrarily selected as a background color in the Munsell color-order system, a point B is determined at a such position so that the ratio of distance a:b is over 4:1. A first distance "a" represents a distance between the point N and the point A while a second distance "b" represents a distance between the point N and the point B. An optimal color is selected from a predetermined range E within the point B for a background color. In other words, supposing the distance "b" is 1, the point B is selected so that the distance "a" is equal to or larger than 4. Furthermore, an optimal color is selected from the range E, which is a plane that is limited by an angle ω=15° and signifies a scope of perceptibly single color including the color itself and two adjacent colors. Based upon the exert experience, when a point A is arbitrarily selected as a background color in the Munsell color-order system, by selecting a point B at a such position so that the ratio of distance a b is equal to or over 4:1 and using an optimal color within a range E from the selected point B, the visual identification of a superimposed image by the pen 64 is automatically optimized over the use of a simple supplemental color.

Now referring to FIG. 11, a diagram illustrates a seventh preferred embodiment of the image color display selection according to the current invention. Based upon the expert experience, when a point A is arbitrarily selected as a background color in the Munsell color-order system, a point B is determined at a such position so that the ratio of distance a:b is equal to or over 1:4. A first distance "a" represents a distance between the point N and the point A while a second distance "b" represents a distance between the point N and the point B. An optimal color is selected from a predetermined range E within the point B for a background color. In other words, supposing the distance "a" is 1, the point B is selected so that the distance "b" is equal to or larger than 4. Furthermore, an optimal color is selected from the range E, which is a plane that is limited by an angle ω=15° and signifies a scope of perceptibly single colors including the color itself and two adjacent colors. Based upon the expert experience, when a point A is arbitrarily selected as a background color in the Munsell color-order system, by selecting a point B at a such position so that the ratio of distance a:b is equal to or over 1:4 and using an optimal color within a range E from the selected point B, the visual identification of a superimposed image by the pen 64 is automatically optimized over the use of a simple complementary color.

Now referring to FIGS. 12 and 13, diagrams illustrate an eighth preferred embodiment of the image color display selection according to the current invention. Based upon the expert experience, when a point A is arbitrarily selected as a background color in the Munsell color-order system, a point B is determined at a such position so that a line AB is parallel to the achromatic axis 50 and the point B and the point A have a difference of at least four in lightness. An optimal color is selected from a predetermined range E within the point B for a background color. Furthermore, an optimal color is selected from the range E, which is a plane that is limited by an angle ω=15° and signifies a scope of perceptibly single colors including the color itself and two adjacent colors. Based upon the exert experience, when a point A is arbitrarily selected as a background color in the Munsell color-order system, by selecting a point B at the above described position and using an optimal color within a range E from the selected point B, the visual identification of a superimposed image by the pen 64 is automatically optimized over the use of a simple complementary color. Although the point B may not exist for the sixth or seventh preferred embodiment for certain positions of the point A in the Munsell color-order system, the point B is determined for an optimal pen color at a such position so that a line AB is parallel to the achromatic axis 50 and the point B and the point A have a difference of at least four in lightness as described above. Due to the sufficient difference in lightness, enough visual distinction for a pen color is automatically optimized. That is, as described with respect to FIG. 13, the lightness is shown in ten stages from the lightness 10 being completely white to the lightness 0 being completely black. When an image color and a background color have a difference of four in lightness, they appear to have sufficient visual distinction even if they have the same saturation and hue.

Now referring to FIGS. 14 and 15, diagrams illustrate a ninth preferred embodiment of the image color display selection according to the current invention. Based upon the exert experience, when a point A is arbitrarily selected as a background color on the achromatic axis in Munsell color-order system, a point B is determined at a such position so that a line AB is perpendicular to the achromatic axis 50 and the point B and the point A have the same lightness but a saturation difference of four. An optimal color is selected from a predetermined range E within the point B for a background color. Furthermore, an optimal color is selected from the range E, which is a plane that is limited by an angle ω=15° and signifies a scope of perceptibly single colors including the color itself and two adjacent colors. Although the point B may not exist for the sixth or seventh preferred embodiment for certain positions of the point A in the Munsell color-order system, the point B is determined for an optimal pen color at a such position so that a line AB is parallel to the achromatic axis 50 and the point B and the point A have a difference of at least four in saturation as described above. Due to the sufficient difference in saturation, enough visual distinction for a pen color is automatically optimized. As shown in FIG. 15, for a certain point A, the point B exists on the achromatic axis 50, and the above described optimal pen color selection is also applicable to this situation.

Figure 21:
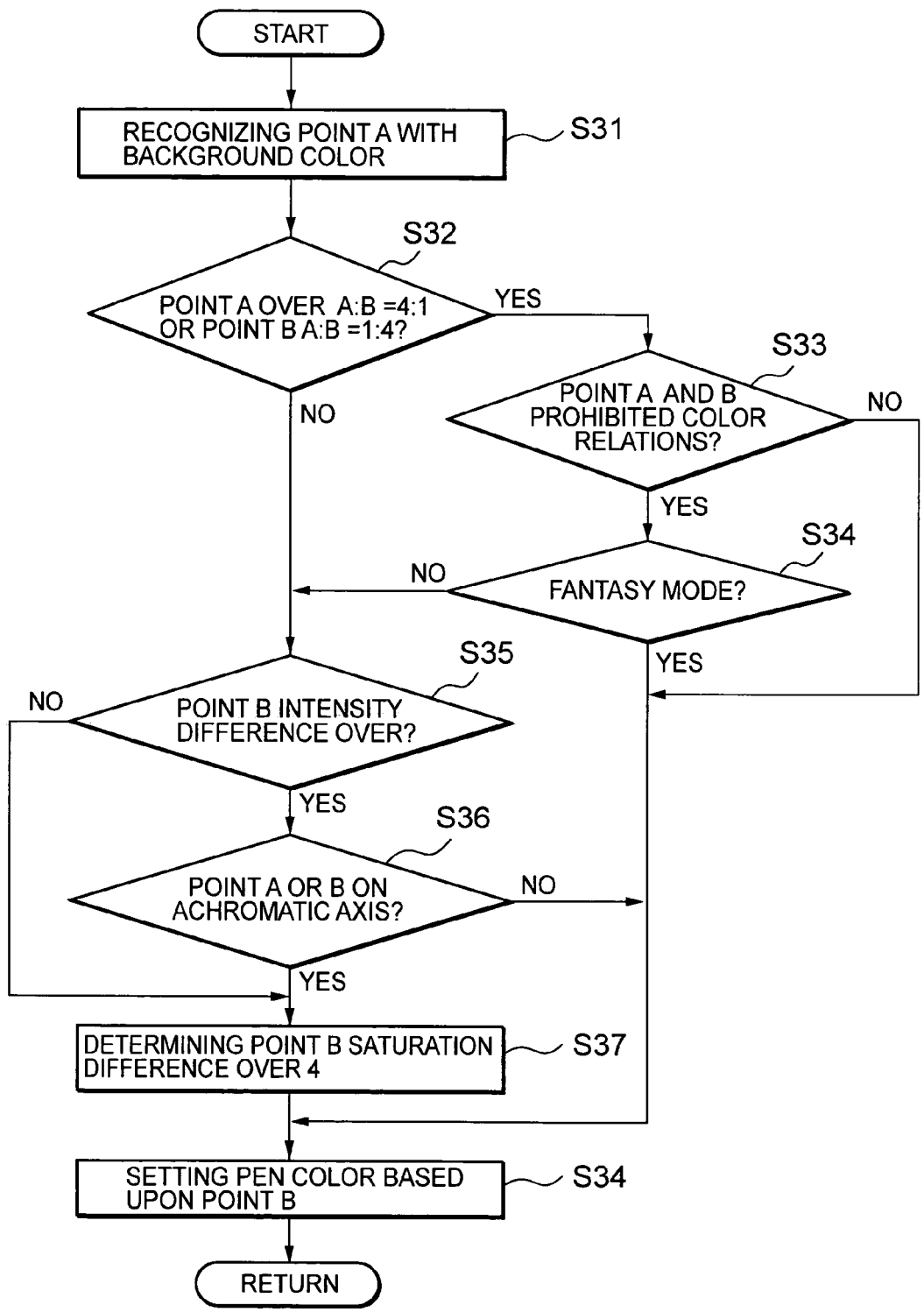
FIG. 21 is a flow chart illustrating steps involved in a tenth preferred embodiment of the optimal image color selection system according to the current invention.

Now referring to FIGS. 16 and 21, diagrams illustrate a tenth preferred embodiment of the image color display selection according to the current invention. In general, in the above described sixth and seventh embodiments, when the point A and the point B belong to a predetermined pair of prescribed color combinations as represented in Munsell color-order system, the pen color as specified by the point B is further processed. That is, assuming that any shade of pink color is prohibited for use in an official meeting, the color display device 61 excludes the pink pen color. As shown in FIG. 16, a shaded range indicates a predetermined combination of colors such as 5RR (red-purple), −10(green), 5R (red), −5G, 10P (purple) and −10GY (green yellow) in the Mussel color chart. This color range is excluded form the first and second preferred embodiments. In the fifth preferred embodiment, the process as described in the eighth and ninth preferred embodiments is performed to select an image or display color.

FIG. 21 illustrates steps involved in the exemplary control process according to the current invention. In a step S31, point A is selected in the Munsell color-order system as a background color. With respect to the point A, it is determined in a step S32 whether or not a point B exists in such a way that a:b is equal to or over 4:1 as in the case of the sixth preferred embodiment or a:b is equal to or over 1:4 as in the case of the seventh preferred embodiment. When the corresponding point B exists in the Munsell color system, it is further determined in a step S33 whether or not the points A and B are a prohibited color combination as shown in FIG. 14. If the points A and B are not one of the prescribed color combinations, the process proceeds to a step S34 to select a pen color based upon the point B. On the other hand, when the points A and B are one of the prescribed color combinations, it is further determined in a step S38 whether or not the process in a predetermined fantasy mode.

Still referring to FIG. 21, if it is in the fantasy mode, the process proceeds to a step S34 to select a pen color based upon the point B. In other words, as shown in the sixth and seventh preferred embodiments, the pen color is selected based upon the point B by overruling the prescribed color combination. The fantasy mode is specified by a key or a button on an operational panel. When the conditions in the step S32 are not met, the process proceeds to a step S35. Similarly, even though the conditions in the step S32 are met when the points A and B are in the prohibited color combination without the overruling fantasy mode, the process also proceeds to the step S35. In the step S35, it is further determined whether or not the point B exists at a location where there is a difference in lightness of at least 4 from the point A on a perpendicular line as described with respect to the eighth preferred embodiment. If the above specified point B fails to exist in the step S35, the process proceeds to a step S37, where the point B is determined at a location where there is a difference in saturation of at least 4 from the point A. On the other hand, if the above specified point B exists in the step S35, it is further determined in a step 36 whether or not the point A or the point B is on the achromatic axis 50. If neither of the points A and B is on the achromatic axis, the process proceeds to the step S34. If either of the points A and B is on the achromatic axis, the process proceeds to the step S37.

Although the sixth or tenth preferred embodiment includes a coordinate input detection means such as a tablet 63 and a coordinate detection unit 66, the units are not necessarily limited to the above combination. For example, an optical coordinate detection means is applicable while the pen 64 itself further optionally includes a coordinate detection function. A pointing device is not also limited to a pen and includes other devices such as a touch pad using a finger of an operator. Similarly, the color display means 62 is not limited to the disclosed embodiments and further includes other types of color display means.

Figure 22:
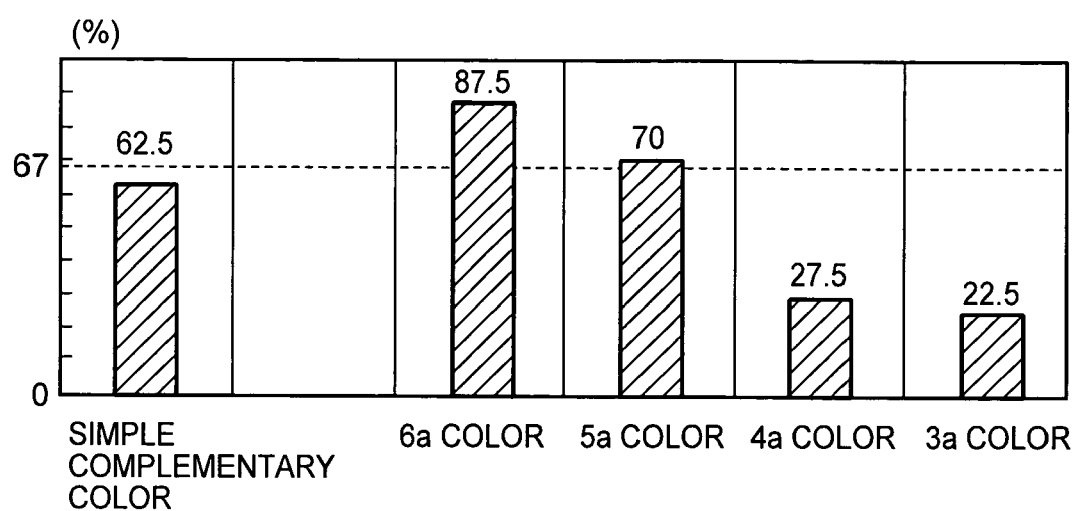
FIG. 22 is a chart indicates the evaluation of the pen display color that is automatically selected by the seventh preferred embodiment according to the current invention.

Now referring to FIG. 22, a chart indicates the evaluation of the pen display color that is automatically selected by the seventh preferred embodiment according to the current invention. The evaluation data is compiled from eight observers. As a sample observation color, a simple complementary color is used as a pen color against the background color, and the distance a+b between the points A and B is set to 6a, 5a, 4a and 3a. As summarized in a table 1, the evaluation is made in a scale of one through five, five being the best. Against the five background colors (BG) A through E, a different pen color (PC) is evaluated, and the different pen colors include the simple complementary color (CC) as well as 6a, 5a, 4a and 3a colors. For each pen color, each observer evaluated the visual distinction, and the number of observers who give more than three is also provided. Based upon the table 1, FIG. 22 is a chart representing the percentage of observers who evaluated that a particular pen color is easy to read.

TABLE 1

| SAMPLE | | OBSERVER | | | | | | | | NO. OF OBSERVERS |
|---|---|---|---|---|---|---|---|---|---|---|
| BG | PC | 1 | 2 | 3 | 4 | 5 | 6 | 7 | 8 | |
| A | CC | 5 | 2 | 1 | 2 | 3 | 4 | 3 | 2 | 4 |
|   | 6a | 5 | 5 | 4 | 4 | 4 | 4 | 5 | 4 | 8 |
|   | 5a | 5 | 3 | 4 | 4 | 4 | 4 | 4 | 4 | 8 |
|   | 4a | 3 | 1 | 2 | 2 | 2 | 3 | 3 | 1 | 3 |
|   | 3a | 2 | 2 | 1 | 3 | 1 | 3 | 3 | 1 | 3 |
| B | CC | 5 | 2 | 3 | 4 | 3 | 4 | 3 | 3 | 7 |
|   | 5a | 4 | 3 | 3 | 4 | 3 | 4 | 4 | 3 | 8 |
|   | 4a | 2 | 2 | 2 | 4 | 2 | 3 | 2 | 2 | 2 |
|   | 3a | 2 | 1 | 1 | 3 | 1 | 2 | 2 | 1 | 1 |
| C | CC | 4 | 2 | 1 | 3 | 2 | 2 | 2 | 1 | 2 |

TABLE 1-continued

| SAMPLE | | OBSERVER | | | | | | | | NO. OF OBSERVERS |
|---|---|---|---|---|---|---|---|---|---|---|
| BG | PC | 1 | 2 | 3 | 4 | 5 | 6 | 7 | 8 | |
|   | 6a | 5 | 5 | 3 | 4 | 3 | 4 | 3 | 4 | 8 |
|   | 5a | 3 | 3 | 2 | 4 | 2 | 3 | 2 | 2 | 4 |
|   | 4a | 2 | 1 | 1 | 2 | 1 | 2 | 2 | 1 | 0 |
|   | 3a | 2 | 1 | 1 | 2 | 1 | 2 | 2 | 1 | 0 |
| D | CC | 5 | 4 | 2 | 2 | 3 | 4 | 3 | 4 | 6 |
|   | 6a | 4 | 4 | 2 | 4 | 3 | 4 | 4 | 3 | 7 |
|   | 5a | 3 | 3 | 2 | 4 | 2 | 3 | 4 | 2 | 5 |
|   | 4a | 2 | 2 | 1 | 4 | 1 | 3 | 3 | 1 | 3 |
|   | 3a | 2 | 2 | 1 | 4 | 2 | 3 | 3 | 1 | 3 |
| E | CC | 4 | 2 | 3 | 4 | 2 | 4 | 4 | 3 | 6 |
|   | 6a | 4 | 2 | 3 | 4 | 2 | 4 | 3 | 2 | 5 |
|   | 5a | 3 | 1 | 2 | 3 | 2 | 4 | 2 | 1 | 3 |
|   | 4a | 3 | 1 | 1 | 3 | 2 | 4 | 2 | 1 | 3 |
|   | 3a | 3 | 1 | 1 | 2 | 2 | 4 | 2 | 1 | 2 |

As shown in FIG. 22, approximately two thirds of the observers identified a pen color at the Point B to be easily recognizable if the pen color is above 4a while less than two thirds easily identified a pen color if the pen color is equal to or less than 4a.

It is to be understood, however, that even though numerous characteristics and advantages of the present invention have been set forth in the foregoing description, together with details of the structure and function of the invention, the disclosure is illustrative only, and that although changes may be made in detail, especially in matters of shape, size and arrangement of parts, as well as implementation in software, hardware, or a combination of both, the changes are within the principles of the invention to the full extent indicated by the broad general meaning of the terms in which the appended claims are expressed.

What is claimed is:

1. A method of selecting an optimal color with respect to a background color using the Munsell color-order system, the Munsell color-order system being represented in a three dimensional space around an achromatic axis in a vertical direction, the vertical direction representing a predetermined lightness range of lightness levels, a horizontal direction representing a predetermined saturation range of saturation levels, a circumference around the achromatic axis representing a predetermined hue range of hue levels, comprising the steps of:
   selecting a first point in the Munsell color-order system as a first color; and
   selecting a second point in the Munsell color-order system as a second color at a predetermined relative distance from the first point, a first distance and a second distance being defined from the achromatic axis respectively to the first point and the second point, a ratio of the first distance over the second distance being equal to or more than four, wherein the second color is distinctive in combination with the first color for desired human perception.

2. The method of selecting an optimal color with respect to a background color using the Munsell color-order system according to claim 1 further comprising an additional step of determining an optimal color range from the second point in the Munsell color-order system for the second color.

3. The method of selecting an optimal color with respect to a background color using the Munsell color-order system according to claim 2 wherein the optimal color range is defined on a circular plane that is perpendicular to the relative distance line at the second point, the circular plane being defined by a radius from the second point.

4. The method of selecting an optimal color with respect to a background color using the Munsell color-order system according to claim 1 wherein the first point is off the achromatic axis, the first point and the second point forming a perpendicularly intersecting line that intersects the achromatic axis and is perpendicular to the achromatic axis.

5. The method of selecting an optimal color with respect to a background color using the Munsell color-order system according to claim 4 wherein the predetermined lightness range is from zero to ten, the perpendicularly intersecting line intersecting the achromatic axis at the lightness level of five.

6. The method of selecting an optimal color with respect to a background color using the Munsell color-order system according to claim 1 wherein the first point is on the achromatic axis while the second point is off the achromatic axis, the first point and the second point forming a perpendicularly intersecting line that intersects the achromatic axis and is perpendicular to the achromatic axis.

7. The method of selecting an optimal color with respect to a background color using the Munsell color-order system according to claim 1 wherein the first point and the second point form a parallel line with respect to the achromatic axis.

8. The method of selecting an optimal color with respect to a background color using the Munsell color-order system according to claim 1 wherein the first color is a background color while the second color is a font color.

9. A method of selecting an optimal color with respect to a background color using the Munsell color-order system, the Munsell color-order system being represented in a three dimensional space around an achromatic axis in a vertical direction, the vertical direction representing a predetermined lightness range of lightness levels, a horizontal direction representing a predetermined saturation range of saturation levels, a circumference around the achromatic axis representing a predetermined hue range of hue levels, comprising the steps of:
selecting a first point in the Munsell color-order system as a first color; and
selecting a second point in the Munsell color-order system as a second color at a predetermined relative distance from the first point, a first distance and a second distance being defined from the achromatic axis respectively to the first point and the second point, a ratio of the first distance over the second distance being equal to or less than one-fourth, wherein the second color is distinctive in combination with the first color for desired human perception.

10. The method of selecting an optimal color with respect to a background color using the Munsell color-order system according to claim 9 further comprising an additional step of determining an optimal color range from the second point in the Munsell color-order system for the second color.

11. The method of selecting an optimal color with respect to a background color using the Munsell color-order system according to claim 10 wherein the optimal color range is defined on a circular plane that is perpendicular to the relative distance line at the second point, the circular plane being defined by a radius from the second point.

12. The method of selecting an optimal color with respect to a background color using the Munsell color-order system according to claim 9 wherein the first point is off the achromatic axis, the first point and the second point forming a perpendicularly intersecting line that intersects the achromatic axis and is perpendicular to the achromatic axis.

13. The method of selecting an optimal color with respect to a background color using the Munsell color-order system according to claim 12 wherein the predetermined lightness range is from zero to ten, the perpendicularly intersecting line intersecting the achromatic axis at the lightness level of five.

14. The method of selecting an optimal color with respect to a background color using the Munsell color-order system according to claim 9 wherein the first point is on the achromatic axis while the second point is off the achromatic axis, the first point and the second point forming a perpendicularly intersecting line that intersects the achromatic axis and is perpendicular to the achromatic axis.

15. The method of selecting an optimal color with respect to a background color using the Munsell color-order system according to claim 9 wherein the first point and the second point form a parallel line with respect to the achromatic axis.

16. The method of selecting an optimal color with respect to a background color using the Munsell color-order system according to claim 9 wherein the first color is a background color while the second color is a font color.

17. A memory medium storing a computer executable program for selecting an optimal color with respect to a background color using the Munsell color-order system, the Munsell color-order system being represented in a three dimensional space around an achromatic axis in a vertical direction, the vertical direction representing a predetermined lightness range of lightness levels, a horizontal direction representing a predetermined saturation range of saturation levels, a circumference around the achromatic axis representing a predetermined hue range of hue levels, the computer executable performing the tasks of:
selecting a first point in the Munsell color-order system as a first color; and
selecting a second point in the Munsell color-order system as a second color at a predetermined relative distance from the first point, a first distance and a second distance being defined from the achromatic axis respectively to the first point and the second point, a ratio of the first distance over the second distance being equal to or more than four, wherein the second color is distinctive in combination with the first color for desired human perception.

18. The memory medium storing a computer executable program for selecting an optimal color with respect to a background color using the Munsell color-order system according to claim 17 further comprising an additional task of determining an optimal color range from the second point in the Munsell color-order system for the second color.

19. The memory medium storing a computer executable program for selecting an optimal color with respect to a background color using the Munsell color-order system according to claim 18 wherein the optimal color range is defined on a circular plane that is perpendicular to the relative distance line at the second point, the circular plane being defined by a radius from the second point.

20. The memory medium storing a computer executable program for selecting an optimal color with respect to a background color using the Munsell color-order system according to claim 17 wherein the first point is off the achromatic axis, the first point and the second point forming a perpendicularly intersecting line that intersects the achromatic axis and is perpendicular to the achromatic axis.

21. The memory medium storing a computer executable program for selecting an optimal color with respect to a background color using the Munsell color-order system according to claim 20 wherein the predetermined lightness range is from zero to ten, the perpendicularly intersecting line intersecting the achromatic axis at the lightness level of five.

22. The memory medium storing a computer executable program for selecting an optimal color with respect to a background color using the Munsell color-order system according to claim 17 wherein the first point is on the achromatic axis while the second point is off the achromatic axis, the first point and the second point forming a perpendicularly intersecting line that intersects the achromatic axis and is perpendicular to the achromatic axis.

23. The memory medium storing a computer executable program for selecting an optimal color with respect to a background color using the Munsell color-order system according to claim 17 wherein the first point and the second point form a parallel line with respect to the achromatic axis.

24. The memory medium storing a computer executable program for selecting an optimal color with respect to a background color using the Munsell color-order system according to claim 17 wherein the first color is a background color while the second color is a font color.

25. A memory medium storing a computer executable program for selecting an optimal color with respect to a background color using the Munsell color-order system, the Munsell color-order system being represented in a three dimensional space around an achromatic axis in a vertical direction, the vertical direction representing a predetermined lightness range of lightness levels, a horizontal direction representing a predetermined saturation range of saturation levels, a circumference around the achromatic axis representing a predetermined hue range of hue levels, comprising the steps of:
    selecting a first point in the Munsell color-order system as a first color; and
    selecting a second point in the Munsell color-order system as a second color at a predetermined relative distance from the first point, a first distance and a second distance being defined from the achromatic axis respectively to the first point and the second point, a ratio of the first distance over the second distance being equal to or less than one-fourth, wherein the second color is distinctive in combination with the first color for desired human perception.

26. The memory medium storing a computer executable program for selecting an optimal color with respect to a background color using the Munsell color-order system according to claim 25 further comprising an additional task of determining an optimal color range from the second point in the Munsell color-order system for the second color.

27. The memory medium storing a computer executable program for selecting an optimal color with respect to a background color using the Munsell color-order system according to claim 26 wherein the optimal color range is defined on a circular plane that is perpendicular to the relative distance line at the second point, the circular plane being defined by a radius from the second point.

28. The memory medium storing a computer executable program for selecting an optimal color with respect to a background color using the Munsell color-order system according to claim 25 wherein the first point is off the achromatic axis, the first point and the second point forming a perpendicularly intersecting line that intersects the achromatic axis and is perpendicular to the achromatic axis.

29. The memory medium storing a computer executable program for selecting an optimal color with respect to a background color using the Munsell color-order system according to claim 28 wherein the predetermined lightness range is from zero to ten, the perpendicularly intersecting line intersecting the achromatic axis at the lightness level of five.

30. The memory medium storing a computer executable program for selecting an optimal color with respect to a background color using the Munsell color-order order system according to claim 25 wherein the first point is on the achromatic axis while the second point is off the achromatic axis, the first point and the second point forming a perpendicularly intersecting line that intersects the achromatic axis and is perpendicular to the achromatic axis.

31. The memory medium storing a computer executable program for selecting an optimal color with respect to a background color using the Munsell color-order system according to claim 25 wherein the first point and the second point form a parallel line with respect to the achromatic axis.

32. The memory medium storing a computer executable program for selecting an optimal color with respect to a background color using the Munsell color-order order system according to claim 25 wherein the first color is a background color while the second color is a font color.

33. A system for selecting an optimal color with respect to a background color using the Munsell color-order system, comprising:
    a memory storage unit for storing data for representing the Munsell color-order system, the Munsell color-order system being represented in a three dimensional space around an achromatic axis in a vertical direction, the vertical direction representing a predetermined lightness range of lightness levels, a horizontal direction representing a predetermined saturation range of saturation levels, a circumference around the achromatic axis representing a predetermined hue range of hue levels;
    a processing unit connected to said memory storage unit for selecting a first point in the Munsell color-order system as a first color, said processing unit selecting a second point in the Munsell color-order system as a second color at a predetermined relative distance from the first point, a first distance and a second distance being defined from the achromatic axis respectively to the first point and the second point, a ratio of the first distance over the second distance being equal to or more than four, wherein the second color is distinctive in combination with the first color for desired human perception.

34. The system for selecting an optimal color with respect to a background color using the Munsell color-order system according to claim 33 wherein said processing unit further determines an optimal color range from the second point in the Munsell color-order system for the second color.

35. The system for selecting an optimal color with respect to a background color using the Munsell color-order system according to claim 34 wherein the optimal color range is defined on a circular plane that is perpendicular to the relative distance line at the second point, the circular plane being defined by a radius from the second point.

36. The system for selecting an optimal color with respect to a background color using the Munsell color-order system according to claim 33 wherein the first point is off the achromatic axis, the first point and the second point forming a perpendicularly intersecting line that intersects the achromatic axis and is perpendicular to the achromatic axis.

37. The system for selecting an optimal color with respect to a background color using the Munsell color-order system according to claim 36 wherein the predetermined lightness range is from zero to ten, the perpendicularly intersecting line intersecting the achromatic axis at the lightness level of five.

38. The system for selecting an optimal color with respect to a background color using the Munsell color-order system according to claim 33 wherein the first point is on the achromatic axis while the second point is off the achromatic axis, the first point and the second point forming a perpendicularly intersecting line that intersects the achromatic axis and is perpendicular to the achromatic axis.

39. The system for selecting an optimal color with respect to a background color using the Munsell color-order system according to claim 33 wherein the first point and the second point form a parallel line with respect to the achromatic axis.

40. The system for selecting an optimal color with respect to a background color using the Munsell color-order system according to claim 33 wherein the first color is a background color while the second color is a font color.

41. A system for selecting an optimal color with respect to a background color using the Munsell color-order system, comprising:
a memory storage unit for storing data for representing the Munsell color-order system, the Munsell color-order system being represented in a three dimensional space around an achromatic axis in a vertical direction, the vertical direction representing a predetermined lightness range of lightness levels, a horizontal direction representing a predetermined saturation range of saturation levels, a circumference around the achromatic axis representing a predetermined hue range of hue levels;
a processing unit connected to said memory storage unit for selecting a first point in the Munsell color-order system as a first color, said processing unit selecting a second point in the Munsell color-order system as a second color at a predetermined relative distance from the first point, a first distance and a second distance being defined from the achromatic axis respectively to the first point and the second point, a ratio of the first distance over the second distance being equal to or less than one-fourth, wherein the second color is distinctive in combination with the first color for desired human perception.

42. The system for selecting an optimal color with respect to a background color using the Munsell color-order system according to claim 41 wherein said processing unit further determines an optimal color range from the second point in the Munsell color-order system for the second color.

43. The system for selecting an optimal color with respect to a background color using the Munsell color-order system according to claim 42 wherein the optimal color range is defined on a circular plane that is perpendicular to the relative distance line at the second point, the circular plane being defined by a radius from the second point.

44. The system for selecting an optimal color with respect to a background color using the Munsell color-order system according to claim 41 wherein the first point is off the achromatic axis, the first point and the second point forming a perpendicularly intersecting line that intersects the achromatic axis and is perpendicular to the achromatic axis.

45. The system for selecting an optimal color with respect to a background color using the Munsell color-order system according to claim 44 wherein the predetermined lightness range is from zero to ten, the perpendicularly intersecting line intersecting the achromatic axis at the lightness level of five.

46. The system for selecting an optimal color with respect to a background color using the Munsell color-order system according to claim 41 wherein the first point is on the achromatic axis while the second point is off the achromatic axis, the first point and the second point forming a perpendicularly intersecting line that intersects the achromatic axis and is perpendicular to the achromatic axis.

47. The system for selecting an optimal color with respect to a background color using the Munsell color-order system according to claim 41 wherein the first point and the second point form a parallel line with respect to the achromatic axis.

48. The system for selecting an optimal color with respect to a background color using the Munsell color-order system according to claim 41 wherein the first color is a background color while the second color is a font color.

49. A method of selecting an optimal color with respect to a background color using Munsell color-order system, the Munsell color-order system being represented in a three dimensional space around an achromatic axis in a vertical direction, the vertical direction representing a predetermined lightness range of lightness levels, a horizontal direction representing a predetermined saturation range of saturation levels, a circumference around the achromatic axis representing a predetermined hue range of hue levels, comprising:
selecting a first point in the Munsell color-order system as a first color;
selecting a second point in the Munsell color-order system as a second color at a predetermined relative distance from the first point, the first point and the second point forming a relative distance line, the second color being sufficiently distinctive in combination with the first color for desired human perception; and
determining an optimal color range of colors from the second point in the Munsell color-order system, the second color being selected from the optimal color range, an inter-point distance being defined between the first point and the second point, the first point and the second point forming a perpendicularly intersecting line that intersects the achromatic axis and is perpendicular to the achromatic axis, wherein the first point is on the achromatic axis while the second point is off the achromatic axis, and wherein the inter-point distance is at least four.

50. A method of selecting an optimal color with respect to a background color using Munsell color-order system, the Munsell color-order system being represented in a three dimensional space around an achromatic axis in a vertical direction, the vertical direction representing a predetermined lightness range of lightness levels, a horizontal direction representing a predetermined saturation range of saturation levels, a circumference around the achromatic axis representing a predetermined hue range of hue levels, comprising:
selecting a first point in the Munsell color-order system as a first color;
selecting a second point in the Munsell color-order system as a second color at a predetermined relative distance from the first point, the first point and the second point forming a relative distance line, the second color being sufficiently distinctive in combination with the first color for desired human perception; and
determining an optimal color range of colors from the second point in the Munsell color-order system, the second color being selected from the optimal color range, wherein an inter-point distance is defined between the first point and the second point, the first point and the second point forming a parallel line that is parallel to the achromatic axis, the inter-point distance being at least four.

51. A memory medium storing a computer executable program for selecting an optimal color with respect to a background color using Munsell color-order system, the Munsell color-order system being represented in a three dimensional space around an achromatic axis in a vertical direction, the vertical direction representing a predetermined lightness range of lightness levels, a horizontal direction representing a predetermined saturation range of saturation levels, a circumference around the achromatic axis representing a predetermined hue range of hue levels, the executable program comprising the steps of:

selecting a first point in the Munsell color-order system as a first color;

selecting a second point in the Munsell color-order system as a second color at a predetermined relative distance from the first point, the first point and the second point forming a relative distance line, the second color being sufficiently distinctive in combination with the first color for desired human perception; and determining an optimal color range of colors from the second point in the Munsell color-order system, the second color being selected from the optimal color range, wherein an inter-point distance is defined between the first point and the second point, the first point and the second point forming a perpendicularly intersecting line that intersects the achromatic axis and is perpendicular to the achromatic axis, and wherein the first point is on the achromatic axis while the second point is off the achromatic axis, the inter-point distance being at least four.

52. A memory medium storing a computer executable program for selecting an optimal color with respect to a background color using Munsell color-order system, the Munsell color-order system being represented in a three dimensional space around an achromatic axis in a vertical direction, the vertical direction representing a predetermined lightness range of lightness levels, a horizontal direction representing a predetermined saturation range of saturation levels, a circumference around the achromatic axis representing a predetermined hue range of hue levels, the executable program comprising the steps of:

selecting a first point in the Munsell color-order system as a first color;

selecting a second point in the Munsell color-order system as a second color at a predetermined relative distance from the first point, the first point and the second point forming a relative distance line, the second color being sufficiently distinctive in combination with the first color for desired human perception; and determining an optimal color range of colors from the second point in the Munsell color-order system, the second color being selected from the optimal color range, wherein an inter-point distance is defined between the first point and the second point, the first point and the second point forming a parallel line that is parallel to the achromatic axis, the inter-point distance being at least four.

53. A system for selecting an optimal color with respect to a background color using Munsell color-order system, comprising:

a memory storage unit for storing data for representing the Munsell color-order system, the Munsell color-order system being represented in a three dimensional space around an achromatic axis in a vertical direction, the vertical direction representing a predetermined lightness range of lightness levels, a horizontal direction representing a predetermined saturation range of saturation levels, a circumference around the achromatic axis representing a predetermined hue range of hue levels;

a processing unit connected to said memory storage unit for selecting a first point as a first color and a second point in the Munsell color-order system as a second color at a predetermined relative distance from the first point, the first point and the second point forming a relative distance line, the second color being sufficiently distinctive in combination with the first color for desired human perception, said processing unit also determining an optimal color range of colors from the second point in the Munsell color-order system, the second color being selected from the optimal color range; and a display unit connected to said processing unit for displaying the second color against the first color, wherein an inter-point distance is defined between the first point and the second point, said processing unit selecting the second point so that the first point and the second point forms perpendicularly intersecting line that intersects the achromatic axis and is perpendicular to the achromatic axis, wherein the first point is on the achromatic axis while the second point is off the achromatic axis, said processing unit selecting the second point so that the inter-point distance is at least four.

54. A system for selecting an optimal color with respect to a background color using Munsell color-order system, comprising:

a memory storage unit for storing data for representing the Munsell color-order system, the Munsell color-order system being represented in a three dimensional space around an achromatic axis in a vertical direction, the vertical direction representing a predetermined lightness range of lightness levels, a horizontal direction representing a predetermined saturation range of saturation levels, a circumference around the achromatic axis representing a predetermined hue range of hue levels;

a processing unit connected to said memory storage unit for selecting a first point as a first color and a second point in the Munsell color-order system as a second color at a predetermined relative distance from the first point, the first point and the second point forming a relative distance line, the second color being sufficiently distinctive in combination with the first color for desired human perception, said processing unit also determining an optimal color range of colors from the second point in the Munsell color-order system, the second color being selected from the optimal color range; and a display unit connected to said processing unit for displaying the second color against the first color, wherein an inter-point distance is defined between the first point and the second point, said processing unit selecting the second point so that the first point and the second point form a parallel line that is parallel to the achromatic axis and that the inter point distance is at least four.

* * * * *